(12) United States Patent
Koide et al.

(10) Patent No.: US 7,102,856 B2
(45) Date of Patent: Sep. 5, 2006

(54) HEAD SLIDER AND MANUFACTURING METHOD THEREOF

(75) Inventors: Soji Koide, Tokyo (JP); Norikazu Ota, Tokyo (JP); Nobuya Oyama, Tokyo (JP); Tetsuro Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 299 days.

(21) Appl. No.: 10/886,719

(22) Filed: Jul. 9, 2004

(65) Prior Publication Data

US 2005/0047016 A1    Mar. 3, 2005

(30) Foreign Application Priority Data

Aug. 8, 2003    (JP) .......................... P2003-290323

(51) Int. Cl.
*G11B 5/60* (2006.01)
(52) U.S. Cl. .................................. 360/234.5
(58) Field of Classification Search .............. 360/234.5, 360/245.8, 245.9, 246, 281.7, 234.4, 234.7, 360/234.8, 324, 128
See application file for complete search history.

(56) References Cited

U.S. PATENT DOCUMENTS

| | | | | |
|---|---|---|---|---|
| 5,530,604 | A * | 6/1996 | Pattanaik | 360/234.5 |
| 5,889,636 | A * | 3/1999 | Arya et al. | 360/234.5 |
| 6,813,118 | B1 * | 11/2004 | Pust et al. | 360/234.5 |
| 6,920,020 | B1 * | 7/2005 | Yamanaka et al. | 360/317 |
| 7,027,264 | B1 * | 4/2006 | Subrahmanyam et al. | 360/234.5 |
| 2002/0122276 | A1 * | 9/2002 | Onodera | 360/234.5 |
| 2004/0114268 | A1 * | 6/2004 | Satoh et al. | 360/75 |
| 2004/0165311 | A1 * | 8/2004 | Yamanaka et al. | 360/128 |
| 2004/0184192 | A1 * | 9/2004 | Ota et al. | 360/128 |
| 2004/0246623 | A1 * | 12/2004 | Yazawa | 360/234.5 |
| 2005/0041340 | A1 * | 2/2005 | Sasaki et al. | 360/324 |
| 2005/0047024 | A1 * | 3/2005 | Yamazaki et al. | 360/294.4 |
| 2005/0094316 | A1 * | 5/2005 | Shiramatsu et al. | 360/234.5 |
| 2005/0213250 | A1 * | 9/2005 | Kurita et al. | 360/234.4 |
| 2006/0077591 | A1 * | 4/2006 | Kurihara et al. | 360/128 |
| 2006/0092570 | A1 * | 5/2006 | Payne et al. | 360/236.5 |
| 2006/0119971 | A1 * | 6/2006 | Kurita et al. | 360/69 |
| 2006/0126224 | A1 * | 6/2006 | Sakamoto et al. | 360/128 |

* cited by examiner

*Primary Examiner*—Allen Cao
(74) *Attorney, Agent, or Firm*—Oliff & Berridge, PLC

(57) ABSTRACT

The head slider in accordance with the present invention comprises a thin-film magnetic head including a magnetoresistive device and an electromagnetic transducer, and a heater adapted to generate heat upon energization. At least one of a reproducing bump, a recording bump, and a heater bump includes a bypass layer extending in a direction intersecting a bump extending direction, a first bump portion positioned closer to a pad-forming surface than is the bypass layer, and a second bump portion positioned on the side of the bypass layer opposite from the first bump portion. The first and second bump portions are displaced from each other in the bypass layer extending direction.

16 Claims, 23 Drawing Sheets

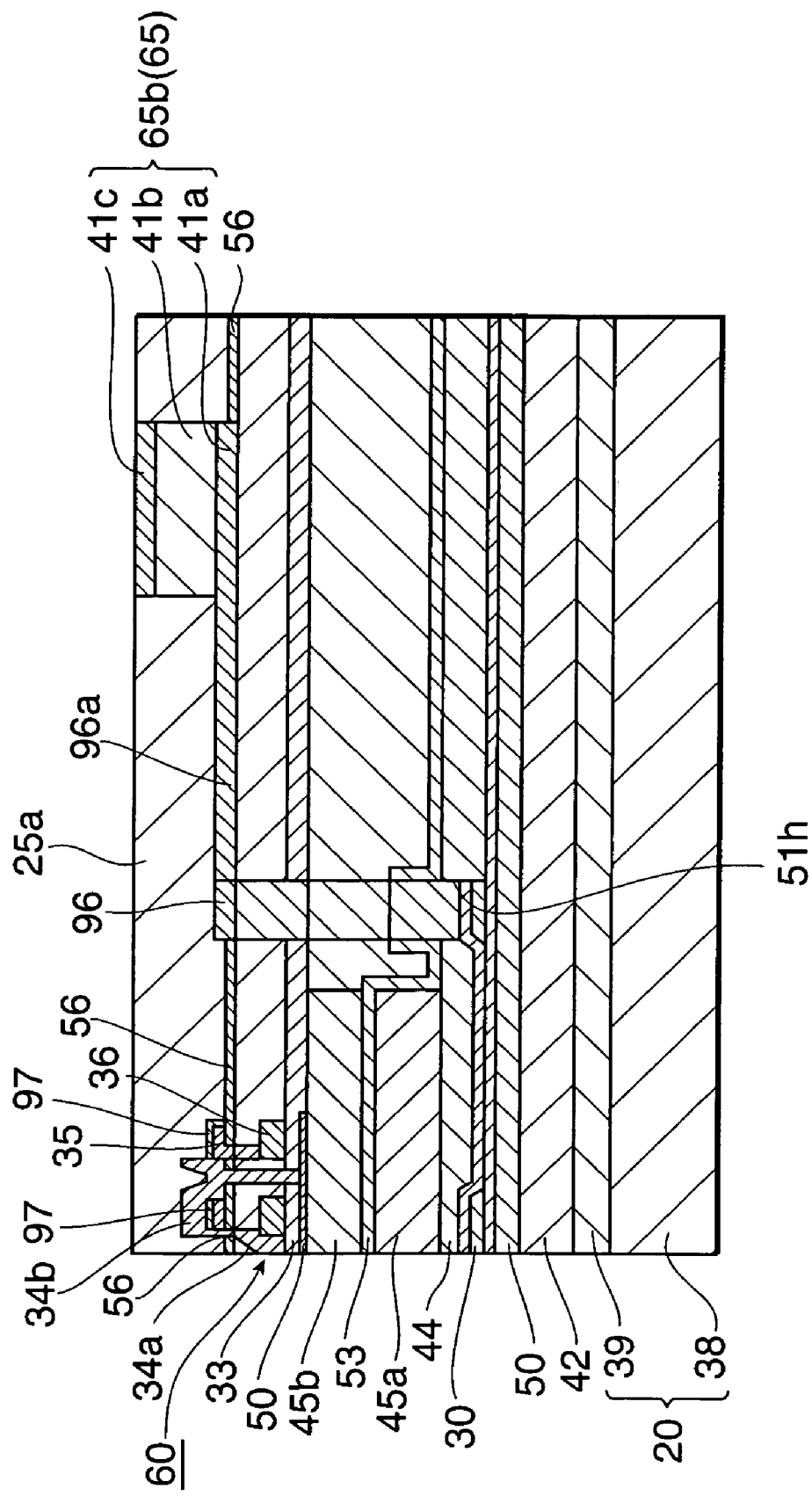

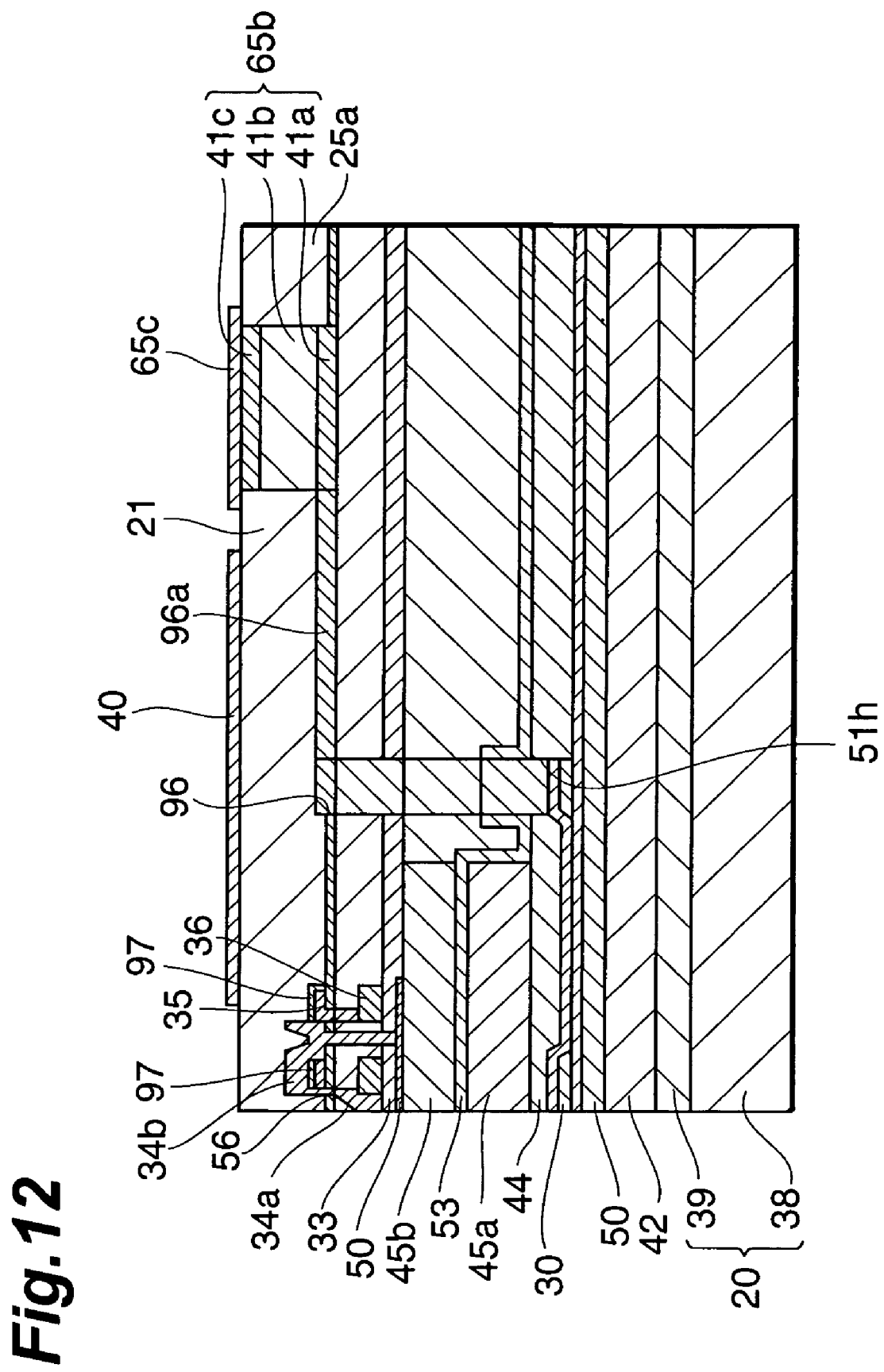

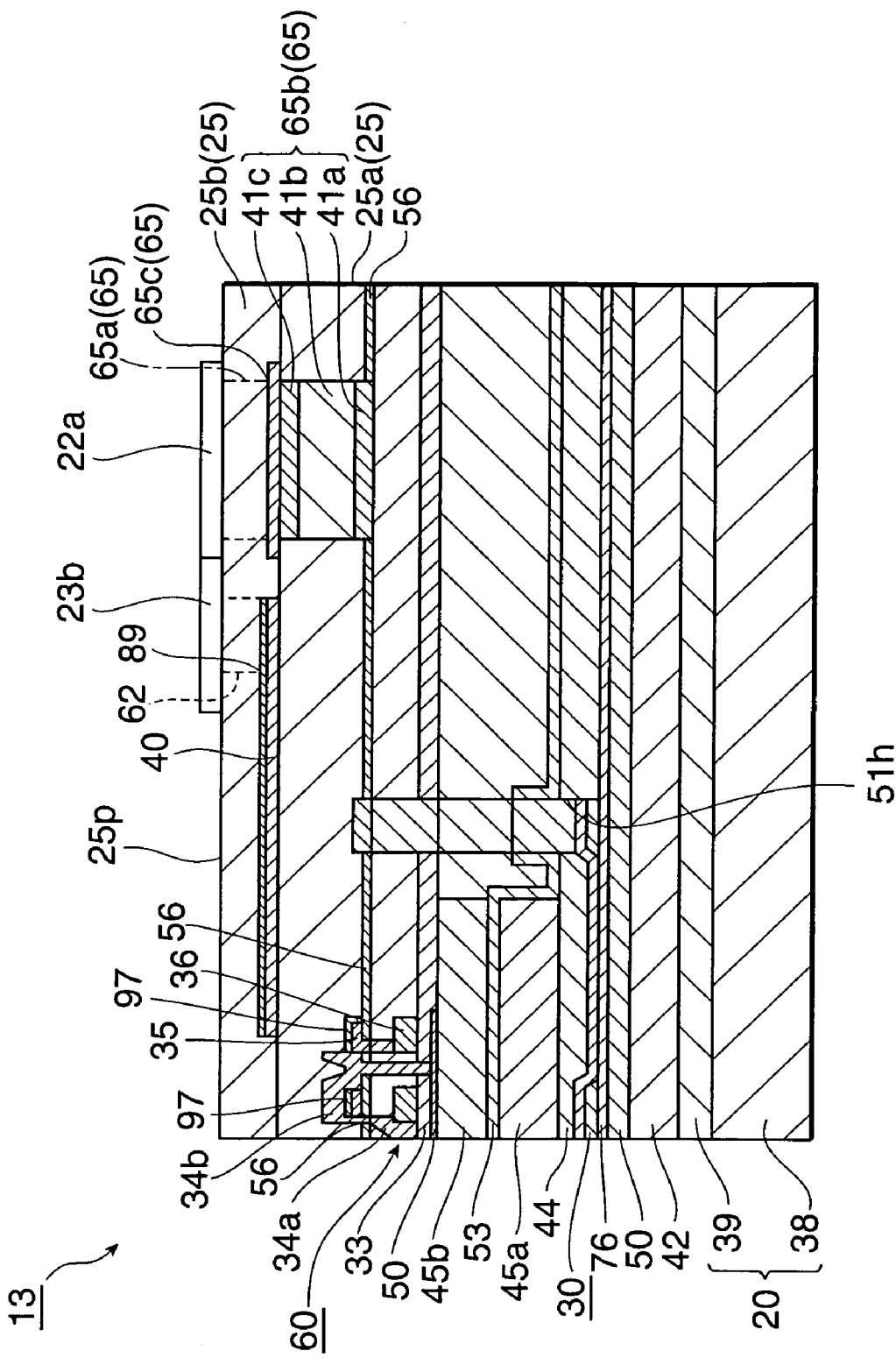

HEAD SLIDER AND MANUFACTURING METHOD THEREOF

BACKGROUND OF THE INVENTION

1. Field of the Invention

The present invention relates to a head slider provided with a thin-film magnetic head, a head gimbal assembly, a hard disk drive, and a method of manufacturing a head slider.

2. Related Background Art

Recently, as the recording density of hard disks increases, the gap between the thin-film magnetic head and the hard disk (recording media), i.e. head flying height, has decreased to 10 nm, which currently seems to be the limit.

SUMMARY OF THE INVENTION

The present inventors have tried to provide a head slider with a heater that generates heat when energized, in order to adjust the gap between the magnetoresistive device and the hard disk. In such a configuration, the magnetoresistive device for reproducing and/or the inductive electromagnetic transducer for recording thermally expand when the heater generates heat, thereby making it possible to set the gap between the magnetoresistive device or the transducer and the hard disk at an appropriate value.

When the head slider is provided with such a heater, it is desirable to dispose not only electrode pads for reproducing and recording, but also an electrode pad for energizing the heater on a pad-forming surface of the head slider. Therefore, it may be necessary to shift the electrode pads for reproducing and recording from their prior position in order to secure a space for the electrode pad for the heater. Each element such as a magnetoresistive device and the electrode pads are connected to each other by electrically conductive bumps that are formed in the head slider.

In order to shift electrode pads for reproducing and recording from their prior position, the following method is one way to adjust the final position of each pad. That is, in the method, a mask pattern for exclusive use, of which the electrode shape and so on are different from prior mask patterns, is utilized before or in the early stage of the bump-forming process for the magnetoresistive device or the electromagnetic transducer. However, in this method, because it is impossible to use the mask pattern for the head slider that is provided with no heater, the product costs increases, and a problem is caused in that the exclusive mask patterns must be manufactured again when the forming position of each pad is newly changed.

An object of the present invention is to provide a head slider, a head gimbal assembly having the head slider, a hard disk drive having the head slider, and a method of manufacturing a head slider that are able to set easily the forming position of an electrode pad for reproducing, an electrode pad for recording, and an electrode pad for a heater.

(1) A head slider according to one aspect of the present invention includes a thin-film magnetic head including a magnetoresistive device for reproducing information and an electromagnetic transducer for recording information, a heater that heats the head slider when the heater is energized, a reproducing-bump, which connects the magnetoresistive device and a pad-forming surface of the head slider, a recording-bump, which connects the electromagnetic transducer with the pad-forming surface; and a heater bump, which connects the heater with the pad forming surface, wherein at least one of the reproducing-bump, the recording-bump, and the heater bump comprises a bypass layer extending in a direction that crosses a direction in which the bump extends, a first bump portion of the at least one bump positioned between the bypass layer and the pad-forming surface, and a second bump portion of the at least one bump positioned on an opposite side of the bypass layer relative to the first bump portion, the first bump portion and the second bump portion are displaced from each other in the direction in which the bypass layer extends. Also, an electrode pad for energizing the magnetoresistive device, an electrode pad for energizing the electromagnetic transducer, and an electrode pad for energizing the heater may be disposed on the pad-forming surface.

In the head slider according to this aspect of the present invention, in at least one of the reproducing-bump, the recording-bump, and the heater-bump, the second bump portion, which is positioned at a root side of the bump, and the first bump portion, which is positioned at a pad-forming surface side of the bump, i.e., a side opposite to a side of the second bump portion, are positioned at different positions with respect to the direction in which the bypass layer extends, while the bypass layer is the boundary between the first and second bump portions. Therefore, the forming position of the electrode pad to be connected to the bump can be set freely no matter where the second bump portion is formed, by adjusting the forming position of the first bump portion.

Preferably, the reproducing-bump and the recording-bump each include a corresponding bypass layer, first bump portion, and second bump portion, and the first bump portions are positioned closer to each other than are the second bump portions. In other words, preferably, the distance between each of the first bump portions is less than the distance between the second bump portions.

With this structure, the bump for reproducing and the bump for recording can be formed more inwardly on the pad-forming surface with ease. Therefore, an electrode pad for the heater can be disposed outside the bump for reproducing and the bump for recording.

More preferably, two of the electrode pads for the heater are provided and are positioned on the pad-forming surface so that the electrode pad for reproducing and the electrode pad for recording are located between the two electrode pads for the heater. That is, each of the electrode pads for the heater is positioned outside the electrode pad for reproducing and the electrode pad for recording.

In such a configuration, the following advantage can be attained. That is, in the case that such a head slider is mounted on an arm member of a head gimbal assembly, wires for energizing that are connected to each of the electrode pads can extend from the pad-forming surface to the base side of the arm member through the side of the head slider so that wires for the electrode pads for the heater are positioned between wires for the electrode pads for reproducing and wires for the electrode pads for recording. With this structure, because the wires for the magnetoresistive device and the wires for the electromagnetic transducer are separated from each other by the wires for the heaters, cross-talk between the wires for the magnetoresistive device and the wires for the electromagnetic transducer is suppressed when current is supplied to the wires for the electromagnetic transducer.

In addition, the heater and the bypass layer may be formed by the same material. In the manufacturing process in this case, the material can be deposited to cover the area in which the heater and the bypass layer are formed, and thereafter the deposited material is patterned so as to form both the heater and the bypass layer, thereby making the manufacturing process easier.

In addition, the bypass layer can be formed so as to extend in a direction perpendicular to at least one of the first bump portion and the second bump portion.

Further, the first bump portion and the second bump portion can be formed so as to extend parallel to each other, and the bypass layer extends in a direction perpendicular to both the first bump portion and the second bump portion.

(2) A head gimbal assembly according to an aspect of the present invention is provided with the head slider described above, and an arm member on which the head slider is mounted. A hard disk drive according to an aspect of the present invention is provided with the head slider mentioned above and a recording medium onto which information is recorded by the electromagnetic transducer and from which recorded information is reproduced by the magnetoresistive device. Because both the head gimbal assembly and the hard disk drive are provided with the above-described head slider, it is easy to set the forming position of an electrode pad for reproducing, an electrode pad for recording, and an electrode pad for a heater.

(3) A method of manufacturing a head slider that includes a magnetoresistive device for reproducing information and an electromagnetic transducer for recording information, and a heater that generates heat when the heater is energized, according to an aspect of the present invention includes: a step of forming bumps that extend from the magnetoresistive device, the electromagnetic transducer, and the heater, wherein the step of forming at least one bump corresponding to at least one of the magnetoresistive device, the electromagnetic transducer, and the heater, includes forming a bypass layer that extends in a direction that crosses the direction in which the at least one bump extends, and after forming the bypass layer, the at least one bump is formed at a position that is different from a position of the at least one bump before forming the bypass layer relative to the direction in which the bypass layer extends.

In the method of manufacturing the head slider according to this aspect of the present invention, at the time of the forming process of at least one bump corresponding to at least one of the magnetoresistive device, the electromagnetic transducer, and the heater, the position before forming the bypass layer, and the position after forming the bypass layer, are different from each other. Therefore, the forming position of the electrode pad to be connected to the bump on the pad-forming surface can be set freely no matter where the bump is formed before forming the bypass layer, by adjusting the forming position of the bump after forming the bypass layer.

In addition, in the method of manufacturing the head slider according to this aspect of the present invention, the bypass layer can be formed at the time of forming of the bumps corresponding to the magnetoresistive device and the electromagnetic transducer. After forming the bypass layer, the bump corresponding to the magnetoresistive device is formed at an area that is closer to the bump corresponding to the electromagnetic transducer than before the forming of the bypass layer, while the bump corresponding to the electromagnetic transducer is formed at an area closer to the magnetoresistive device than before the forming of the bypass layer. In this case, the reproducing-bump and the recording-bump can be formed relatively inwardly on the pad-forming surface. Therefore, an electrode pad for the heater can be disposed outside of the reproducing-bump and the recording-bump. As described above, when a pair of electrode pads for the heater are positioned outside of the bumps for reproducing and recording, cross-talk between wires for the magnetoresistive device and wires for the electromagnetic transducer is suppressed.

In addition, in the method according to this aspect of the present invention, the heater and the bypass layer may be formed by patterning the same material. In this case, the material is deposited to cover the area in which the heater and the bypass layer are formed, and thereafter the deposited material is patterned so as to form both the heater and the bypass layer, thereby making the manufacturing process easier.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 4A is a plan view showing the head slider as seen from the pad-forming surface thereof, whereas

FIG. 8 is a view showing a subsequent manufacturing process;

FIG. 9A is a view showing a subsequent manufacturing process, whereas

FIG. 10A is a view showing a subsequent manufacturing process, whereas

FIG. 11A is a view showing a subsequent manufacturing process, whereas

FIG. 12 is a view showing a subsequent manufacturing process;

FIG. 14A is a view showing a subsequent manufacturing process, whereas

FIG. 15A is a view showing a subsequent manufacturing process, whereas

FIG. 16A is a view showing a subsequent manufacturing process, whereas

FIG. 17 is a view showing a subsequent manufacturing process;

FIG. 19A is a view showing a subsequent manufacturing process, whereas

FIG. 20A is a view showing a subsequent manufacturing process, whereas

FIG. 21A is a view showing a subsequent manufacturing process, whereas

FIG. 22A is a view showing a subsequent manufacturing process, whereas FIG. 23A is a view showing a subsequent manufacturing process, whereas

DESCRIPTION OF PREFERRED EMBODIMENTS

In the following, preferred typical embodiments of the head slider, head gimbal assembly, hard disk drive, and method of manufacturing a head slider in accordance with the present invention will be explained in detail with reference to the accompanying drawings. Among the drawings, constituents identical to each other will be referred to with numerals identical to each other.

[First Embodiment]

Figure 1:
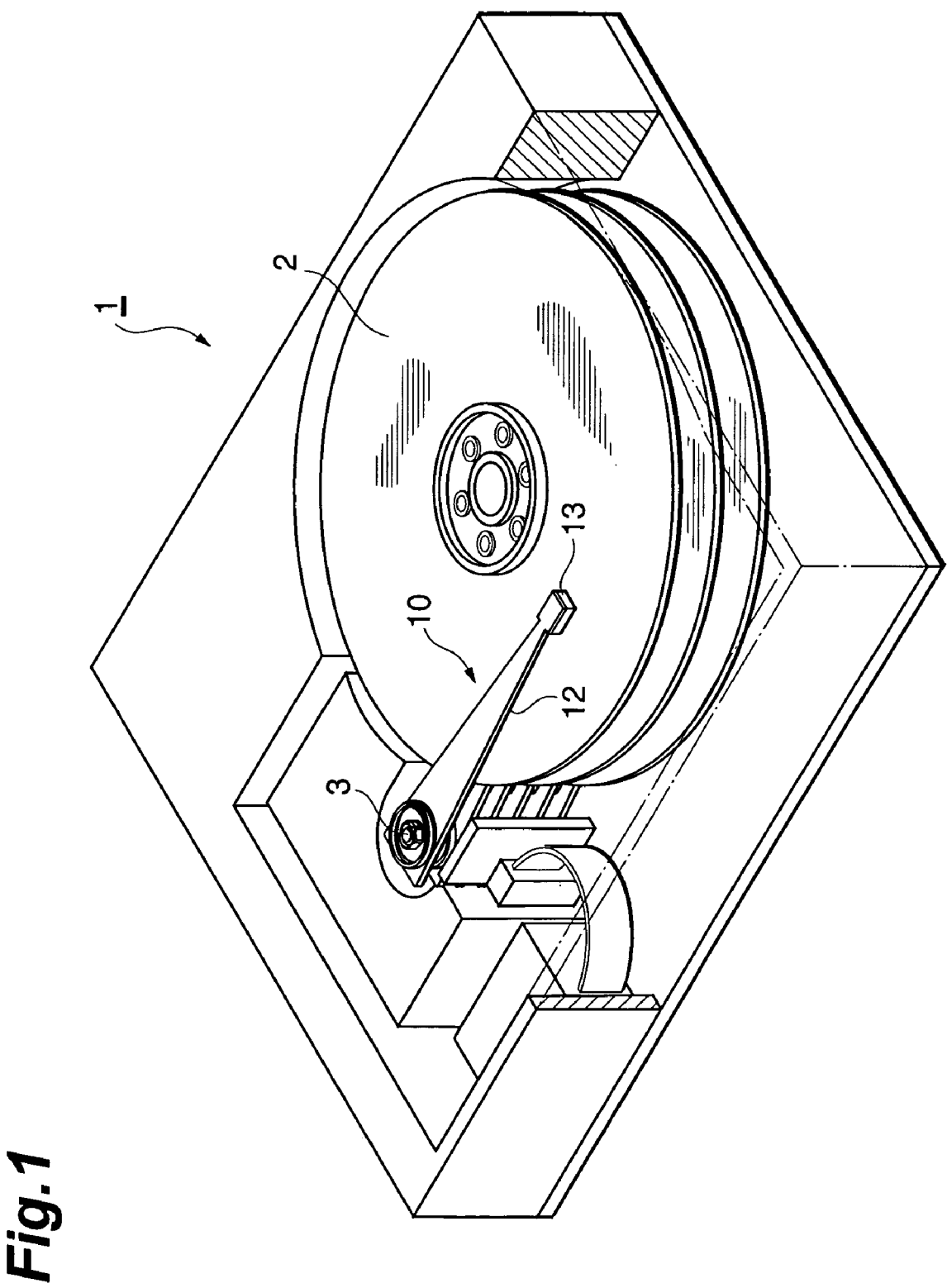
FIG. 1 is a view showing an embodiment of the hard disk drive in accordance with the present invention.
Figure 2:
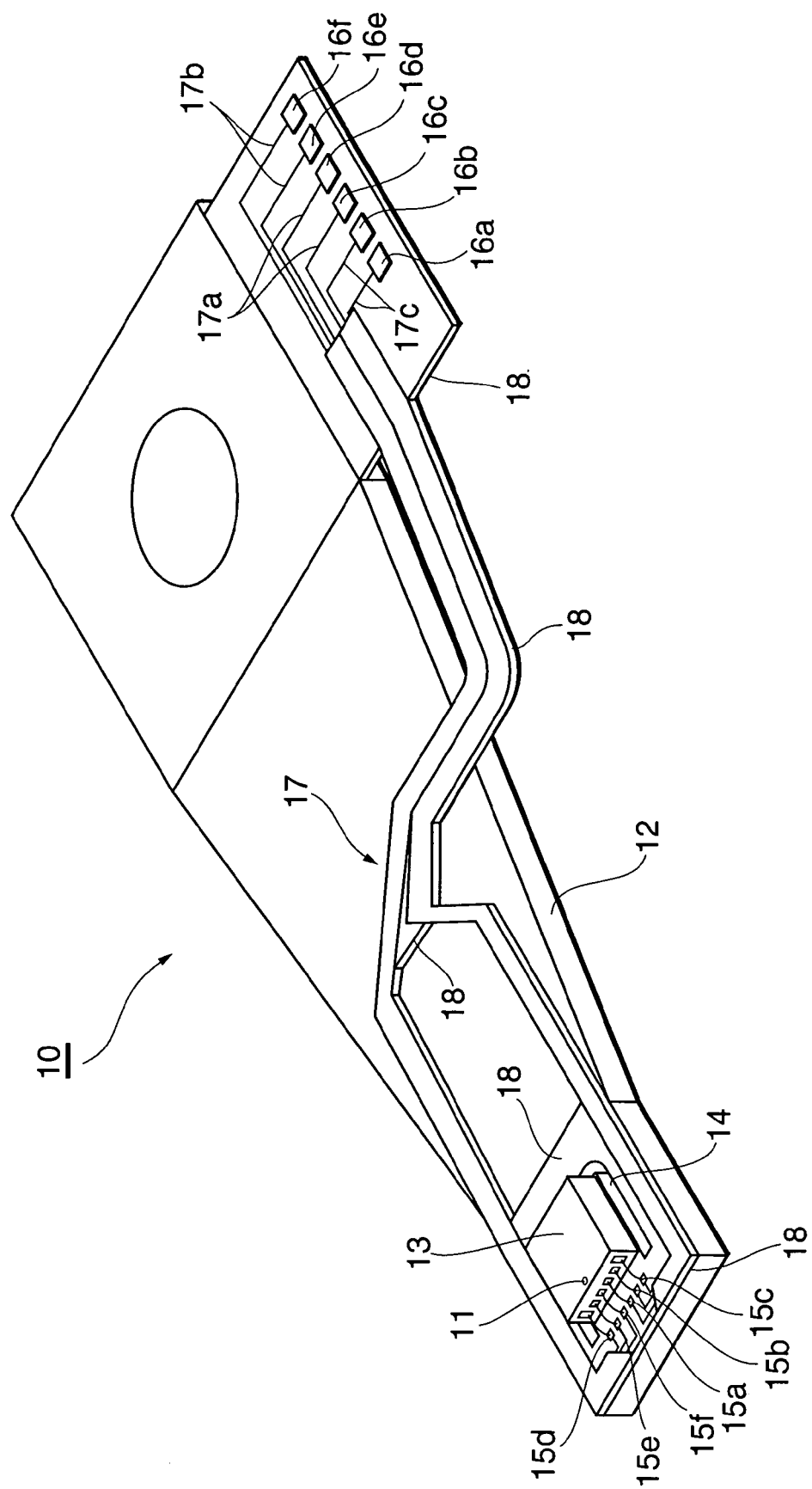
FIG. 2 is a view showing an embodiment of the head gimbal assembly in accordance with the present invention.
Figure 3:
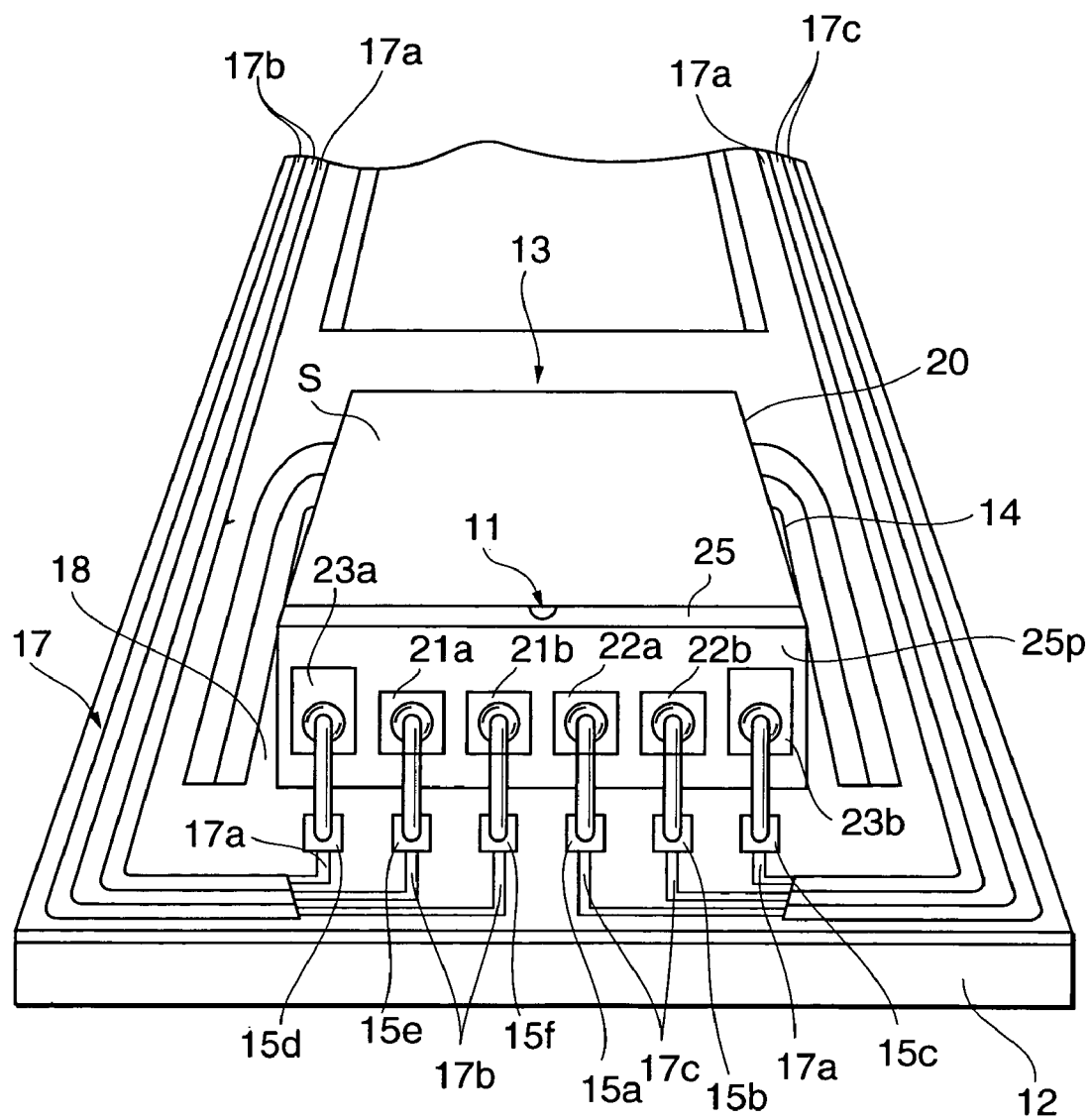
FIG. 3 is an enlarged view of a head slider.

FIG. 1 is a perspective view showing a hard disk drive 1 including a head gimbal assembly 10 mounted with a head slider 13 in accordance with this embodiment. FIG. 2 is an enlarged perspective view of the head gimbal assembly 10. FIG. 3 is an enlarged view of the head slider 13 shown in FIG. 2.

The hard disk drive 1 actuates the head gimbal assembly 10, so as to cause a thin-film magnetic head 11 to record/reproduce magnetic information onto/from a hard disk (recording medium) 2 rotating at a high speed. The thin-film magnetic head 11 comprises an electromagnetic transducer for recording information onto the hard disk, and a magnetoresistive device (hereinafter also referred to as "MR device") for reproducing the information from the hard disk.

The head gimbal assembly 10 is rotatable about a shaft 3 by a voice coil motor, for example. As the head gimbal assembly 10 is rotated, the head slider 13 moves radially of the hard disk 2, i.e., in directions traversing track lines.

As shown in FIGS. 2 and 3, the head gimbal assembly 10 comprises a suspension arm 12 which is a thin plate made of a metal. On the leading end side, the suspension arm 12 is cut out so as to form a tongue 14, on which the head slider 13 is mounted.

With reference to FIG. 3, the head slider 13 will be explained in further detail. The head slider 13 comprises a support 20, made of AlTiC ($Al_2O_3 \cdot TiC$), having a substantially rectangular parallelepiped form, and the thin-film magnetic head 11 formed thereon. Though the thin-film magnetic head 11 is formed near the horizontal center of the support 20 in this drawing, its forming position is not restricted thereto. The upper face of the head slider 13 in the drawing is a medium-opposing surface which opposes a recording surface of the hard disk 2, and is referred to as an air bearing surface (ABS) S. As the hard disk 2 rotates, an airflow accompanying the rotation levitates the head slider 13, thereby separating the air bearing surface S from the recording surface of the hard disk 2. Though not depicted, the air bearing surface S is formed with a slider rail for adjusting the flying height.

For protecting the thin-film magnetic head 11, the surface of the head slider 13 on the front side in the drawing is provided with an overcoat layer 25. The surface of the overcoat layer 25 becomes a pad-forming surface 25p where electrode pads are formed. This surface 25p is formed with a pair of heater electrode pads 23a, 23b (for a heater which will be explained later), a pair of recording electrode pads 21a, 21b, and a pair of reproducing electrode pads 22a, 22b. The pair of heater electrode pads 23a, 23b are disposed such that the recording electrode pads 21a, 21b and reproducing electrode pads 22a, 22b are positioned therebetween. Namely, the heater electrode pads 23a, 23b are positioned on the outside of the recording electrode pads 21a, 21b and reproducing electrode pads 22a, 22b. Though the reproducing electrode pads 22a, 22b are disposed on the right side of the recording electrode pads 21a, 21b in the drawing, their positions may be reversed.

Six terminals 15a to 15f are arranged in a row on the leading end side of the suspension arm 12. The recording electrode pads 21a, 21b are connected to the terminals 15e, 15f, respectively. The reproducing electrode pads 22a, 22b are connected to the terminals 15a, 15b, respectively. The heater electrode pads 23a, 23b are connected to the terminals 15d, 15c, respectively. For connecting the electrode pads to their corresponding terminals 15a to 15f, ball bonding using gold as a bonding material (gold ball bonding) is employed, for example.

Provided on the suspension arm 12 is a printed wiring pattern 17 comprising coated wires 17a to 17c insulated from each other. The printed wiring pattern 17 electrically connects the terminals 15a to 15f to terminals 16a to 16f (see FIG. 2) disposed on the base end side of the suspension arm 12, respectively. The wires 17a to 17c are provided by two each. The wires 17a, 17a are electrically connected to the heater electrode pads 23a, 23b by way of the terminals 15d, 15c, respectively. The wires 17b, 17b are electrically connected to the recording electrode pads 21a, 21b by way of the terminals 15e, 15f, respectively. The wires 17c, 17c are electrically connected to the recording electrode pads 22a, 22b by way of the terminals 15a, 15b, respectively.

As shown in FIG. 2, the printed wiring pattern 17 is drawn from the terminals 15a to 15f on the pad-forming surface 25p side toward the base end of the suspension arm 12 by way of the surroundings (laterals) of the head slider 13, so as to extend to the vicinity of the terminals 16a to 16f. The wires 17a, 17a are connected to the terminals 16c, 16d. The wires 17b, 17b are connected to the terminals 16e, 16f. The wires 17c, 17c are connected to the terminals 16a, 16b. In an area of the printed wiring pattern 17 behind the slider 13, the wires 17a, 17a for the heater electrode pads are positioned between the wires 17b, 17b for the recording electrode pads 21a, 21b and the wires 17c, 17c for the reproducing electrode pads 22a, 22b. The terminals 16a to 16f are connected to a head amplifier (not depicted) or the like for carrying out signal processing for recording and reproducing.

The head slider 13, printed wiring pattern 17, and terminals 15a to 15f, 16a to 16f are disposed on the suspension arm 12 by way of an insulating layer 18, so as to be electrically insulated from the suspension arm 12 made of a metal.

The foregoing configuration allows the MR device and electromagnetic transducer of the thin-film magnetic head 11 and the heater to be energized by way of the terminals 15a to 15f.

Figure 4A:
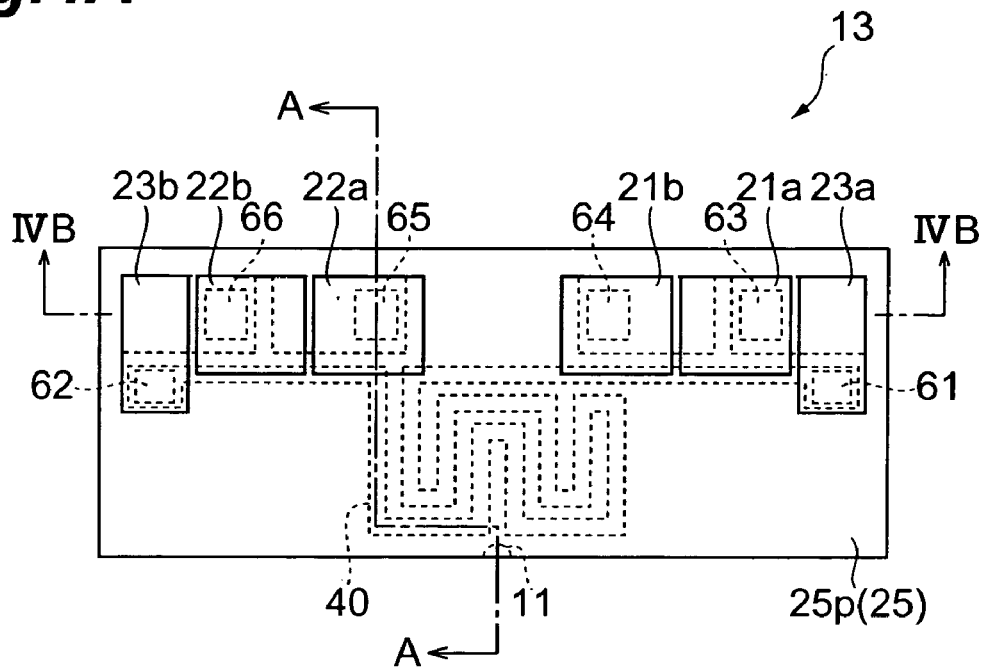

The head slider 13 will now be explained with reference to FIGS. 4A and 4B. FIG. 4A is a plan view as seen from the pad-forming surface 25*p*, whereas FIG. 4B is a sectional view taken along the line IVB—IVB of FIG. 4A.

As shown in FIG. 4A, the overcoat layer 25 incorporates therein a heater 40, adapted to generate heat upon energization, having a winding form with a turning point. The heater 40 is electrically connected to the heater electrode pads 23*a*, 23*b* by way of heater bumps 61, 62 formed from a conductive material, respectively. The electromagnetic transducer (positioned below the part shown in FIG. 4B) of the thin-film magnetic head 11 is connected to the recording electrode pads 21*a*, 21*b* by way of recording bumps 63, 64 formed from a conductive material, respectively. The MR device (positioned below the part shown in FIG. 4B) is connected to the reproducing electrode pads 22*a*, 22*b* by way of reproducing bumps 65, 66 formed from a conductive material, respectively.

Figure 4B:
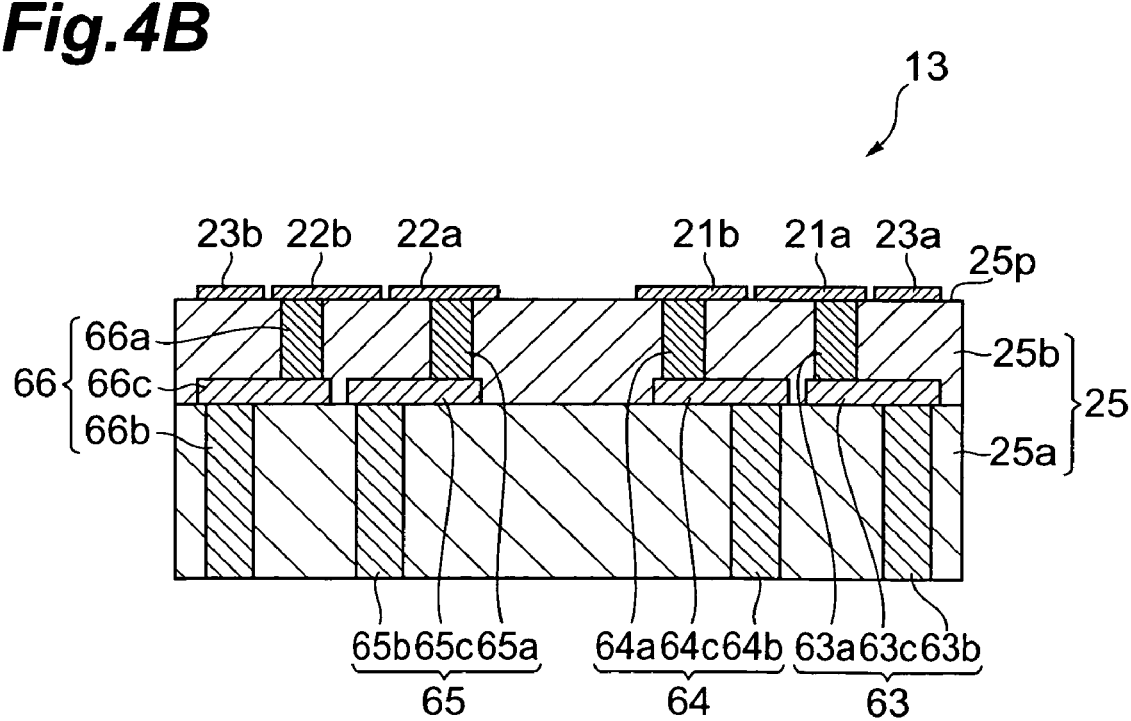
FIG. 4B is a sectional view thereof taken along the line IVB—IVB of FIG. 4A.

As shown in FIG. 4B, each of the recording bumps 63, 64 and reproducing bumps 65, 66 is sectioned into three parts. For example, the recording bump 63 is sectioned into three regions, i.e., a first bump portion 63*a*, a second bump portion 63*b*, and a bypass layer 63*c* for connecting them to each other. The overcoat layer 25 is sectioned into a lower layer 25*a* and an upper layer 25*b*. The first bump portion 63*a* and bypass layer 63*c* are covered with the upper layer 25*b* of the overcoat layer 25, whereas the second bump portion 63*b* is disposed within the lower layer 25*a*.

The first bump portion 63*a* and second bump portion 63*b* extend along the thickness of the overcoat layer 25. The first bump portion 63*a* is positioned closer to the pad-forming surface 25*p* than is the bypass layer 63*c*, whereas the second bump portion 63*b* is positioned on the side of the bypass layer 63*c* opposite from the first bump portion 63*a*. The bypass layer 63*c* extends in a direction (corresponding to the track width direction) intersecting a direction in which the first bump portion 63*a* and second bump portion 63*b* extend as seen from the air bearing surface S. More specifically, the first bump portion 63*a* and second bump portion 63*b* extend in parallel with each other, whereas the bypass layer 63*c* extends in a direction perpendicular to both the first bump portion 63*a* and second bump portion 63*b*. The bypass layer 63*c* may extend in a direction perpendicular to at least one of the first bump portion 63*a* and second bump portion 63*b*. The other bumps 64, 65, 66 are configured similarly in this regard.

The first bump portion 63*a* and second bump portion 63*b* are formed so as to be displaced from each other in the extending direction of the bypass layer 63*c* (track width direction). More specifically, when the recording bump 63 and reproducing bump 66 positioned on the outer sides are concerned, their first bump portions 63*a*, 66*a* are positioned closer to each other than are their corresponding second bump portions 63*b*, 66*b*. Namely, the first bump portion 63*a* of the recording bump 63 is positioned closer to the reproducing bump 66 than is the second bump portion 63*b*. In other words, the distance between the first bump portions 63*a*, 66*a* is shorter than that between the second bump portions 63*b*, 66*b*.

Similarly, when the recording bump 64 and reproducing bump 65 positioned on the inner side are concerned, the distance between the first bump portions 64*a*, 65*a* is shorter than that between the second bump portions 64*b*, 65*b*.

It will be sufficient if the bypass layer 63*c* has such a length that the first and second bump portions can be formed at respective positions different from each other in the track width direction. The length in the depth direction (corresponding to the MR height direction) in FIG. 4B may be longer than that in the lateral direction.

This embodiment yields the following effects. In the recording bumps 63, 64 and reproducing bumps 65, 66, the second bump portions 63*b*, 64*b*, 65*b*, 66*b* on the bump base side are displaced from their opposite first bump portions 63*a*, 64*a*, 65*a*, 66*a* on the pad-forming surface 25*p* side, while the bypass layers 63*c*, 64*c*, 65*c*, 66*c* act as boundaries therebetween. Therefore, positions where electrode pads to be connected to the bumps are formed can be set freely if positions where their first bump portions are formed are adjusted, regardless of positions of their second bump portions in the track width direction. For example, even when the second bump portions are positioned on relatively outer sides in the track width direction, regions for forming heater electrode pads can be secured on the outside of recording electrode pads 21*a*, 21*b* and reproducing electrode pads 22*a*, 22*b* if the first bump portions are formed on the inside. As can also be seen from this fact, heater electrode pads can be formed on the pad-forming surface even when a bump-forming mask pattern in a mode without the heater 40 is used. Also, even when respective positions of the electrode pads are changed by design, the same manufacturing equipment (e.g., mask) as that used before the design change can be utilized as it is until the step of providing the bypass layers 63*c* to 66*c*.

In this embodiment, the heater electrode pads 23*a*, 23*b* are disposed on the outside of the recording electrode pads 21*a*, 21*b* and reproducing electrode pads 22*a*, 22*b*. Therefore, as mentioned above, the wires 17*a*, 17*a* for the heater electrode pads can be positioned between the wires 17*b*, 17*b* for the recording electrode pads 21*a*, 21*b* and the wires 17*c*, 17*c* for the reproducing electrode pads 22*a*, 22*b*. When the wires 17*c*, 17*c* for the MR device and the wires 17*b*, 17*b* for the electromagnetic transducer are separated from each other by the wires 17*a*, 17*a* for the heater as such, crosstalk to the wires 17*c*, 17*c* for the MR device can be prevented from occurring when a current is supplied to the wires 17*b*, 17*b* for the electromagnetic transducer.

With reference to FIGS. 5 to 17, an example of the method of manufacturing a head slider in accordance with this embodiment will now be explained. FIGS. 5 to 8, 12, 13, and 17 are sectional views taken along the line A—A of FIG. 4A.

Figure 5:
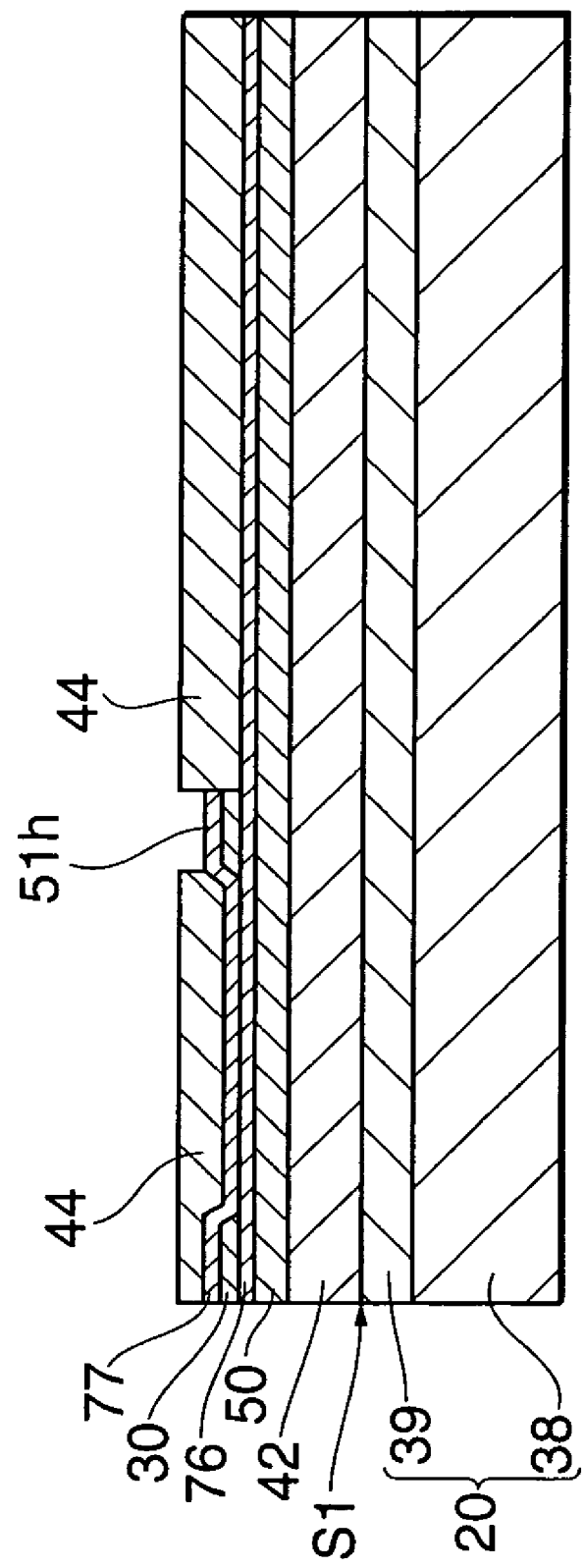
FIG. 5 is a view showing a step in the method of manufacturing a head slider in accordance with a first embodiment.

First, as shown in FIG. 5, a base layer 39 made of an insulating material such as alumina ($Al_2O_3$), for example, is formed with a thickness of about 0.1 $\mu$m to about 10 $\mu$m by sputtering on a substrate 38 made of AlTiC ($Al_2O_3 \cdot TiC$) or the like. The substrate 38 and base layer 39, which constitute the support 20 of the head slider 13 (see FIG. 3), are depicted while their length in the layer thickness direction is reduced. Subsequently, a lower shield layer 42 is formed by plating or the like, and a shield gap layer 50 made of an insulating material such as alumina is formed thereon by sputtering or the like.

Next, another shield gap layer 76 is formed on the shield gap layer 50, and a region on the shield gap layer 76 on the side closer to a virtual surface S1 to become an air bearing surface S (explained as such for convenience) is formed with a GMR device 30 which is a magnetoresistive device. The GMR device 30 has a laminate structure in practice, but is depicted as a single layer for easier viewing. On the GMR device 30, a lead layer 77 electrically connected thereto is formed. Thereafter, an insulating layer 44 made of $Al_2O_3$ or the like is formed by sputtering, for example, so as to cover the GMR device 30 and a region therebehind. Subsequently, in a region on a deeper part of the lead layer 77 in the insulating layer 44, a hole 51*h* for forming a conductive part of the GMR device 30 is formed by utilizing a photolithography technique, ion milling, etc.

Figure 6:
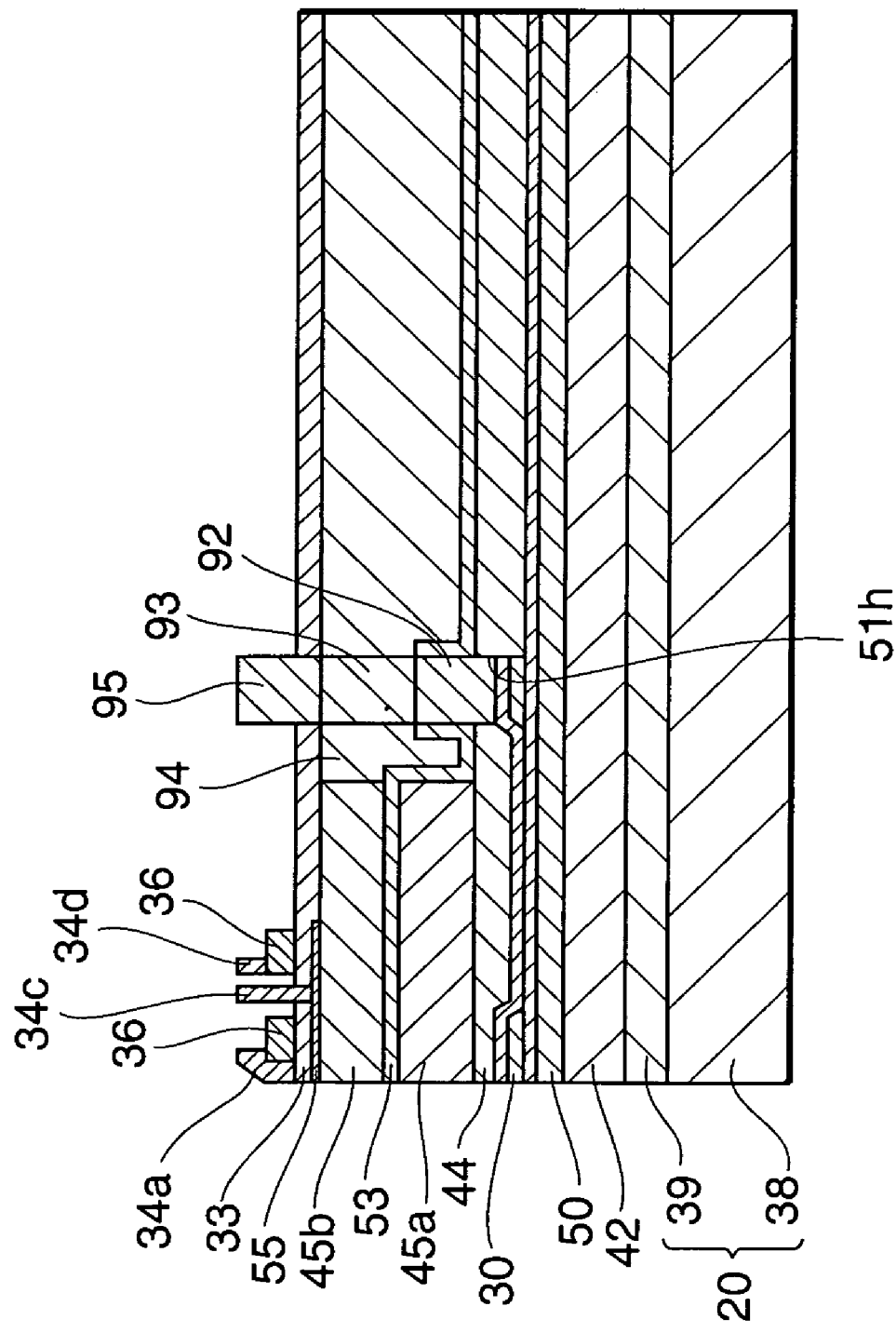
FIG. 6 is a view showing a subsequent manufacturing process.

A subsequent process will be explained with reference to FIG. 6. Using frame plating or the like, a first upper shield layer 45a positioned above the GMR device 30, and a conductive layer 92 filling the hole 51h are formed from the same material. Subsequently, a shield gap layer 53 is formed by sputtering or the like. Then, the part of shield gap layer 53 positioned on the conductive layer 92 formed in the hole 51h is removed. Next, by frame plating or the like, a second upper shield layer 45b positioned above the GMR device 30 and a conductive layer 93 positioned on the conductive layer 92 are formed from the same material. Thereafter, an insulating layer 94 is buried in the surroundings of the second upper shield layer 45b and conductive layer 93, and then they are flattened as a whole.

Subsequently, a shield layer 55 is further formed on a part of the second upper shield layer 45b. Then, a recording gap layer 33 made of alumina, for example, is formed on the surface excluding the part above the hole 51h. Also, by way of an insulating film which is not depicted, a first layer of thin-film coil 36 is formed from Cu, for example, by a thickness of about 1 µm to about 3 µm by plating, for example. On the conductive layer 93, another conductive layer 95 is formed from the same material as that of the coil 36. In each drawing, the cross-sectional form of the thin-film coil 36 is simplified as a rectangular form. Subsequently, a magnetic pole part layer 34a and magnetic layers 34c, 34d are formed at the same time by using a lithography technique, milling, etc.

Figure 7:
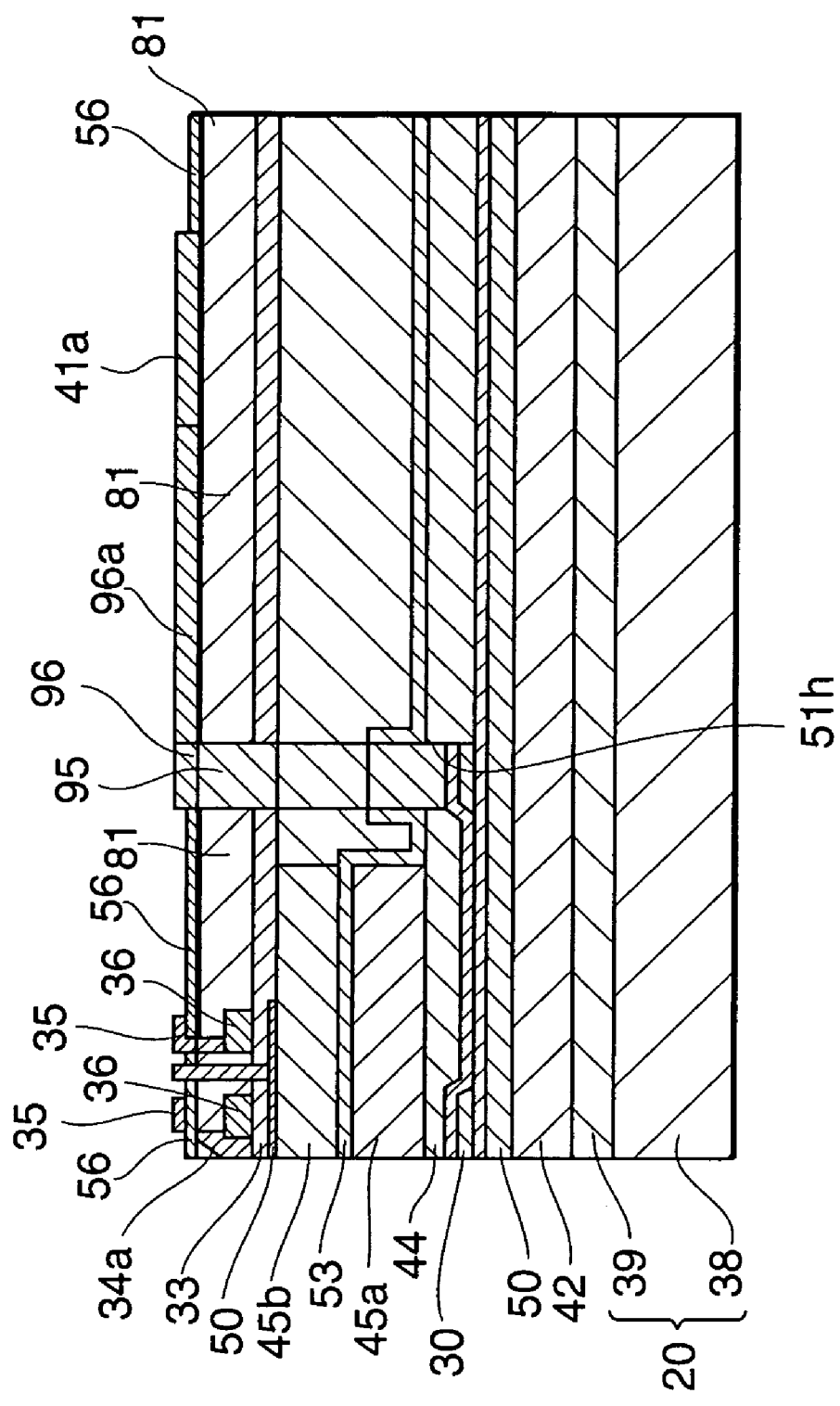
FIG. 7 is a view showing a subsequent manufacturing process.

With reference to FIG. 7, a subsequent step will be explained. First, an insulating layer 81 is laminated, and then the whole surface is flattened. Subsequently, on the insulating layer 81, a photoresist layer 56 having a predetermined pattern is formed. Then, a second layer of thin-film coil 35 is formed on the photoresist layer 56 so as to be placed above the thin-film coil 36. Also, another conductive layer 96 positioned on the conductive layer 95, a first conductive layer 41a positioned on the deeper side in the MR height direction, and a connecting layer 96a for connecting the conductive layers 96 and 41a to each other are formed from the same material as that of the thin-film coil 35. The first conductive layer 41a constitutes a bottom part of the second bump portion 65b in the reproducing bump 65 (see FIGS. 4A and 4B) On the other hand, the conductive layer to become bottom parts of the recording bumps 63, 64 is disposed on the front side of the first conductive layer 41a in the drawing. Though two layers of thin-film coil are laminated in this embodiment, one layer or three or more layers may be provided, and the number of layers and their forming procedure are not limited to those mentioned above.

With reference to FIG. 8, a subsequent process will be explained. First, an insulating layer 97 is formed on the second layer of thin-film coil 35, and a yoke part layer 34b is formed so as to cover a part of the thin-film coil 35 and connect with the magnetic pole part layer 34a. This yields an induction type electromagnetic transducer 60, thereby constructing a thin-film magnetic head including the GMR device 30 and electromagnetic transducer 60. Here, on the first conductive layer 41a, a second conductive layer 41b is formed simultaneously with the yoke part layer 34b from the same material as that of the latter. The magnetic pole part layer 34a and yoke part layer 34b may be formed integrally. Subsequently, a third conductive layer 41c is formed on the second conductive layer 41b, whereby a second bump portion 65b in a reproducing bump 65 is obtained. Though not depicted, second bump portions of a reproducing bump 66 and recording bumps 63, 64 are formed at the same time. Subsequently, a lower layer 25a of an overcoat layer 25 is formed from an insulating material such as $Al_2O_3$ by sputtering, for example, so as to cover the whole surface, and then the surface is ground until the reproducing bump 65 is exposed.

Figure 9A:
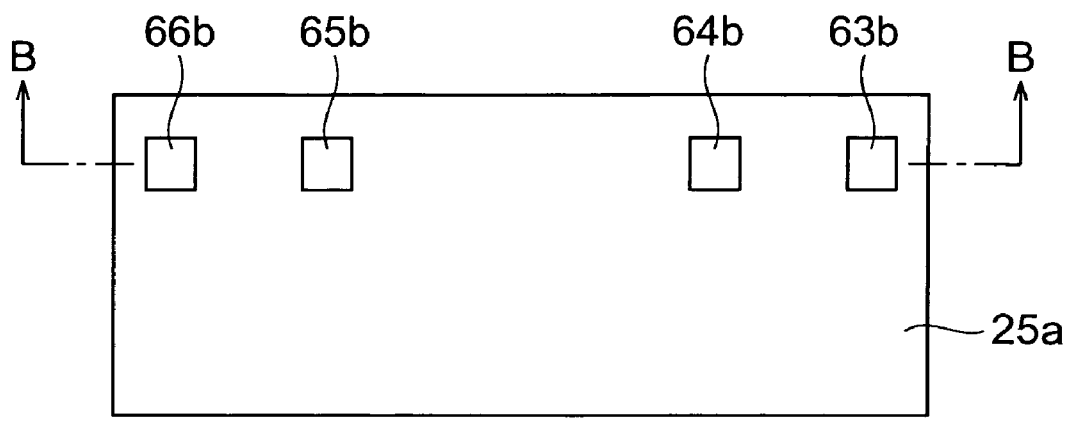
Figure 9B:
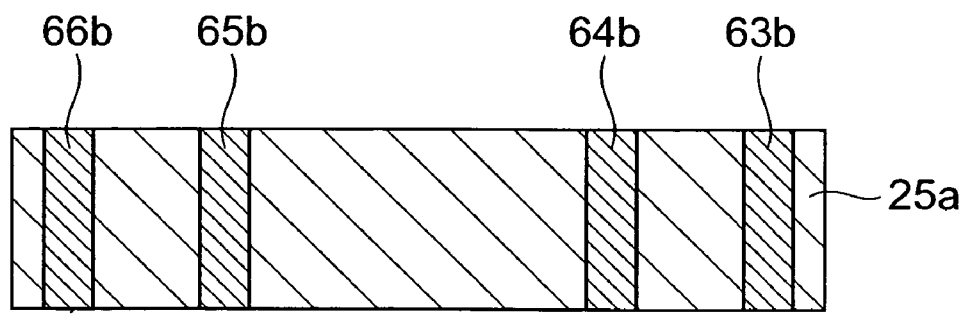
FIG. 9B is a sectional view taken along the line B—B of FIG. 9A.

FIG. 9A is a plan view in the state of FIG. 8, whereas FIG. 9B is sectional view taken along the line B—B of FIG. 9A. In this state, as shown in these drawings, the second bump portions of the reproducing bumps 65, 66 and recording bumps 63, 64 are arranged in a row.

Figure 10A:
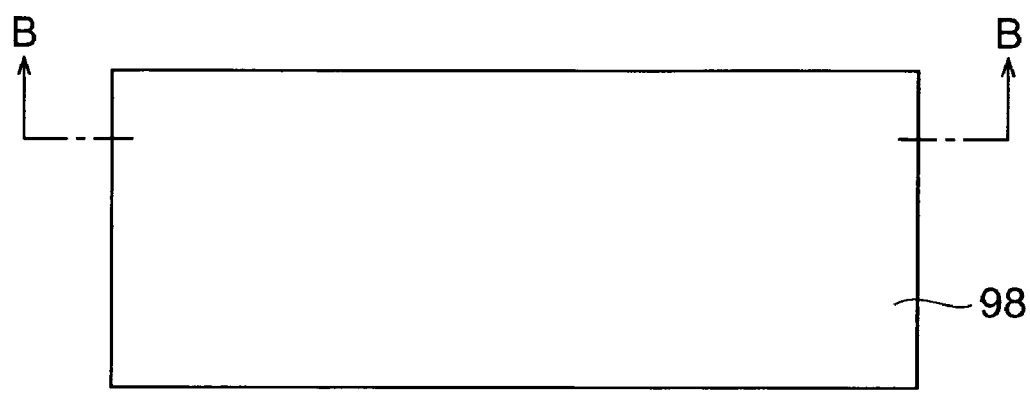
Figure 10B:
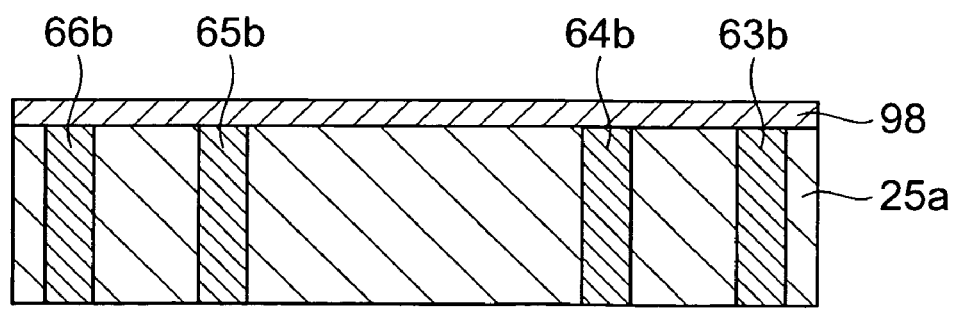
FIG. 10B is a sectional view taken along the line B—B of FIG. 10A.

Subsequently, as shown in FIGS. 10A and 10B, a conductive layer 98 is formed on the whole surface of the wafer. The conductive layer 98 is formed from a material such as Cu, NiFe, NiCu, Ta, Ti, CoNiFe alloys, and FeAlSi alloys by plating, for example.

Figure 11A:
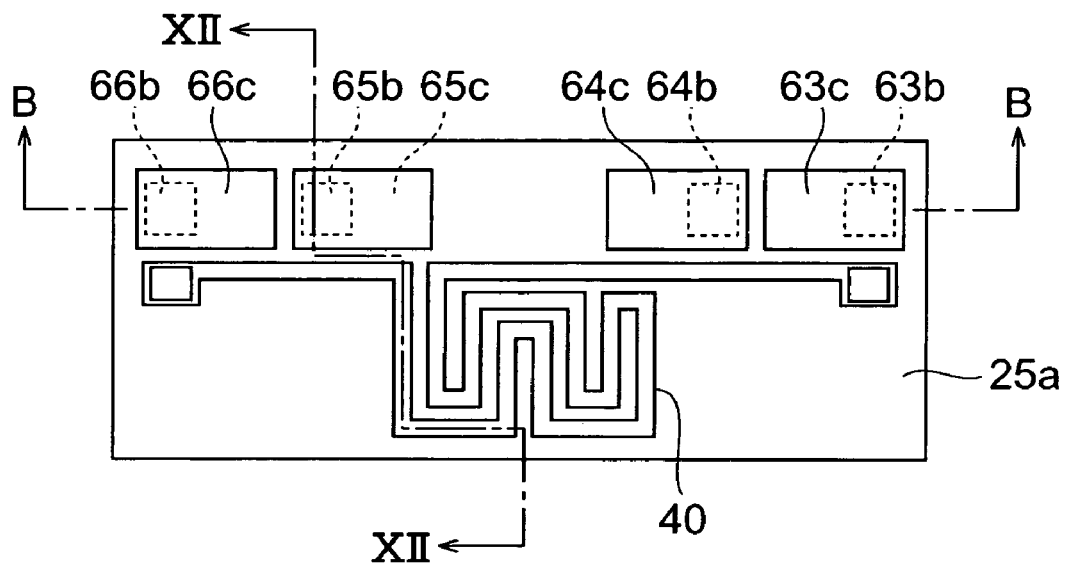
Figure 11B:
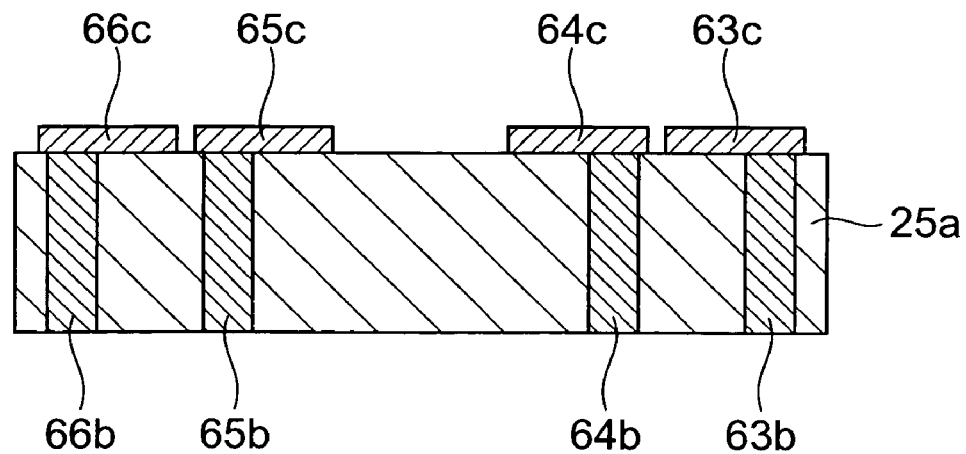
FIG. 11B is a sectional view taken along the line B—B of FIG. 11A.

Next, as shown in FIGS. 11A and 11B, the conductive layer 98 is patterned by ion milling or the like, so as to form a heater 40 and bypass layers 63c, 64c, 65c, 66c. When the heater 40 and the bypass layers are obtained by patterning the same material, the manufacturing process can be made simpler. As mentioned above, the bypass layers 63c to 66c extend in a direction, i.e., track width direction, intersecting the direction in which the second bump portions of the bumps extend.

FIG. 12 is a vertical sectional view taken along the line XII—XII of FIG. 11A. The heater 40 and bypass layer 65c have substantially the same thickness, since they are formed by patterning the same layer.

Figure 13:
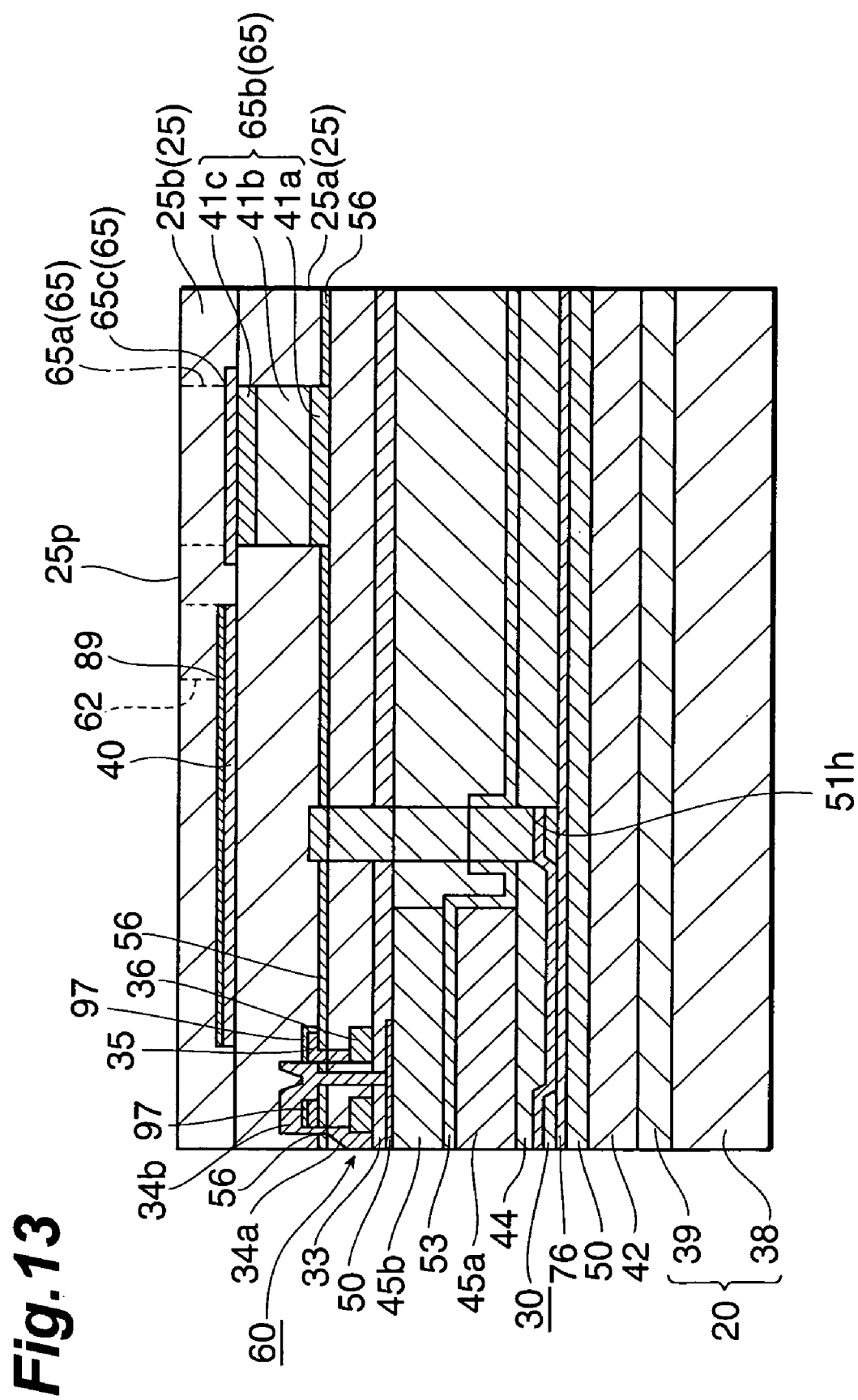
FIG. 13 is a view showing a subsequent manufacturing process.
Figure 14A:
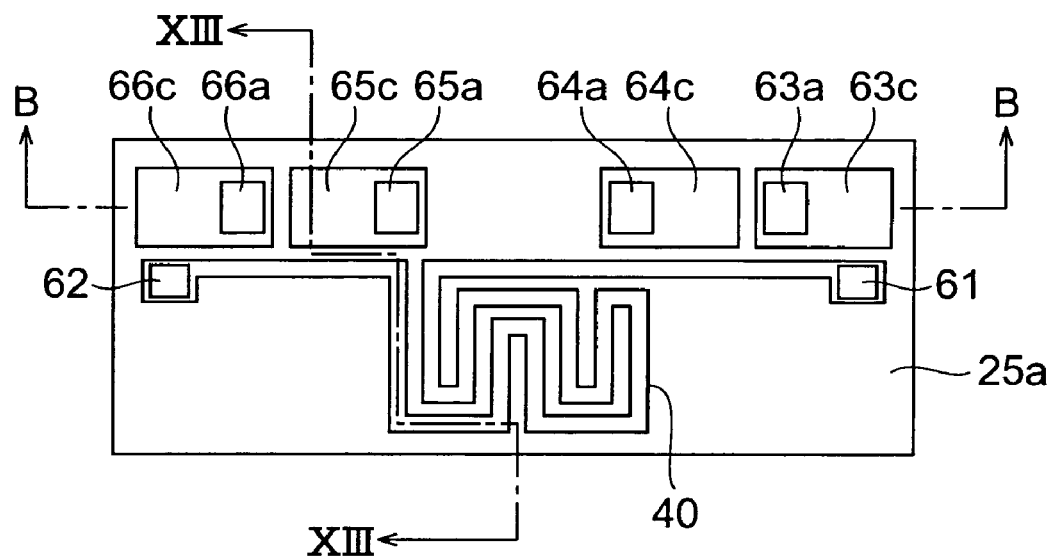
Figure 14B:
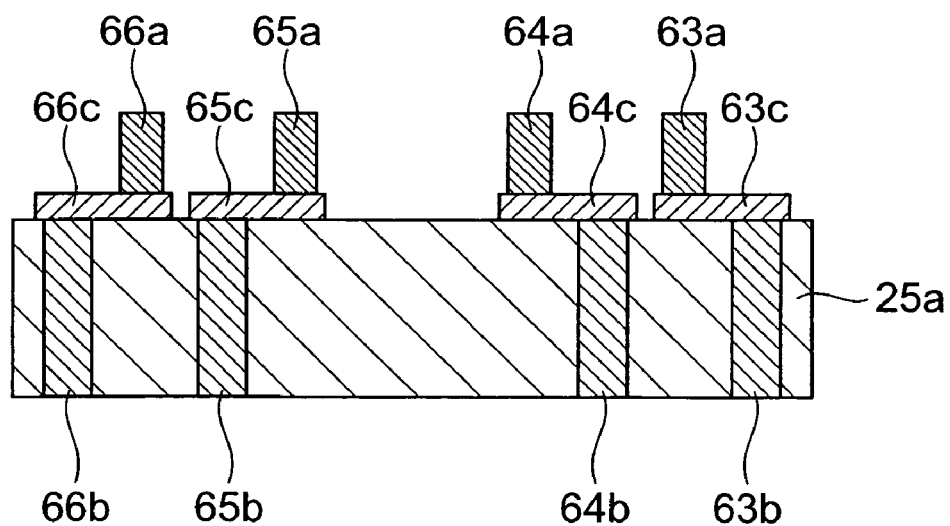
FIG. 14B is a sectional view taken along the line B—B of FIG. 14A.

With reference to FIGS. 13, 14A, and 14B, a subsequent process will be explained. FIG. 13 is a sectional view taken along the line XIII—XIII of FIG. 14A. However, FIG. 13 corresponds to the state of FIG. 16A instead of FIG. 14A.

First, as shown in FIG. 13, a heater coil cap layer 89 made of an insulating material is formed on the heater 40. Subsequently, first bump portions 63a to 66a are formed, so as to yield the recording bumps 63, 64 and reproducing bumps 65, 66. Simultaneously therewith, heater bumps 61, 62 are formed. These bumps are formed from a material such as Cu, NiFe, NiCu, Ta, Ti, CoNiFe alloys, and FeAlSi alloys, for example, by plating.

Thus, after the bypass layers 63c to 66c are formed, bump forming positions in the bypass layer extending direction (track width direction) are different from those before forming the bypass layers in this embodiment. More specifically, when the reproducing bumps 65, 66 corresponding to the MR device 30 are concerned, the first bump portions 65a, 66a are formed closer to the recording bumps 63, 64 corresponding to the electromagnetic transducer 60 than are the second bump portions 65b, 66b before forming the bypass layers. When the recording bumps 63, 64 are concerned, the first bump portions 63a, 64a are formed closer to the reproducing bumps 65, 66 than are the second bump portions 63b, 64b before forming the bypass layers. Namely, the distance between the first bump portion 63a of the recording bump 63 and the first bump portion 66a of the reproducing bump 66 is shorter than the distance between the second bump portion 63b of the recording bump 63 and the second bump portion 66b of the reproducing bump 66. In FIG. 13, the heater bump 62 is positioned on the rear side, whereas the first bump portion 65a of the reproducing bump 65 is positioned on the front side.

Figure 15A:
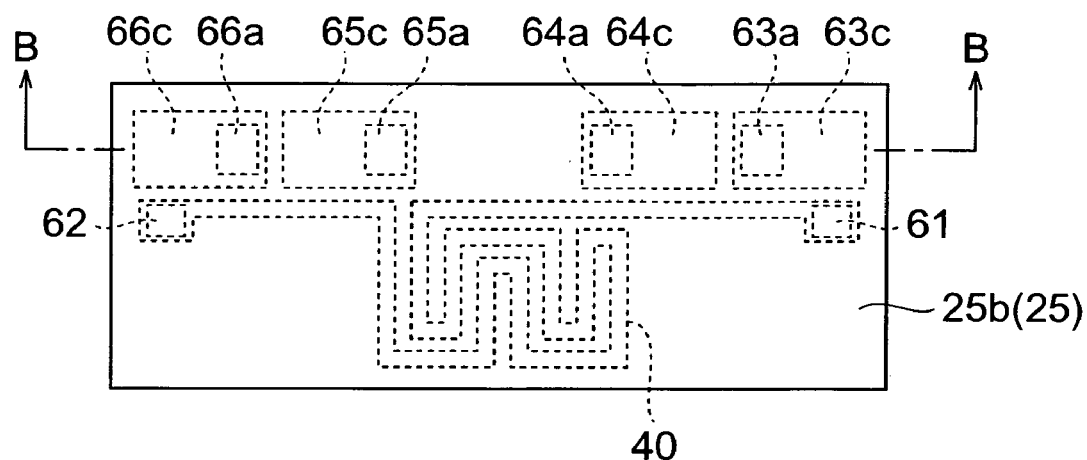
Figure 15B:
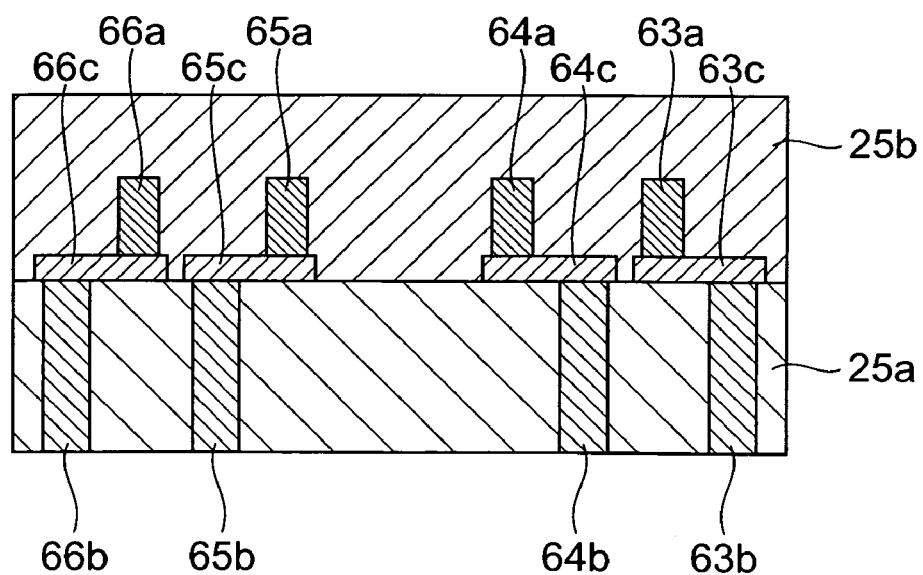
FIG. 15B is a sectional view taken along the line B—B of FIG. 15A.

Next, as shown in FIGS. 15A and 15B, an upper layer 25b of the overcoat layer 25 is laminated while in a state where the bumps 61 to 66 are formed. Here, the upper layer 25b is formed by such a height that the bumps 61 to 66 are covered therewith.

Figure 16A:
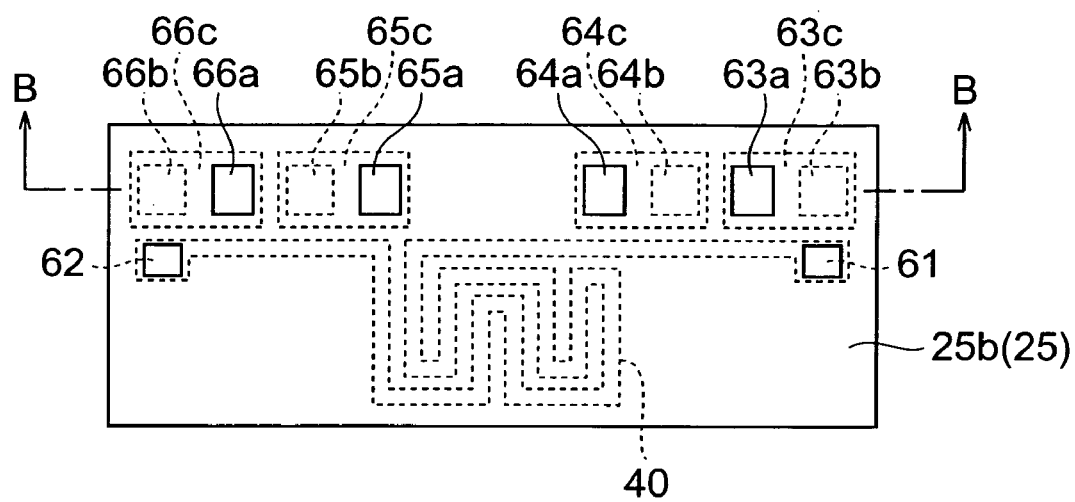
Figure 16B:
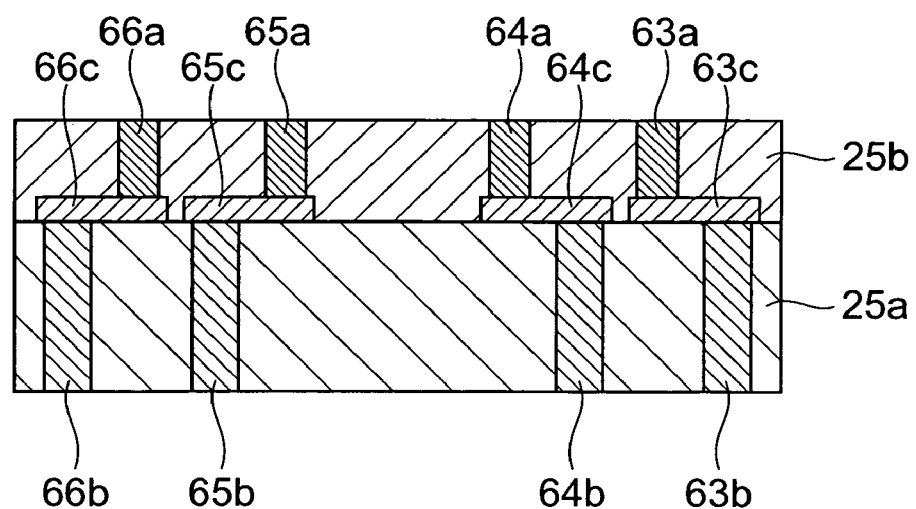
FIG. 16B is a sectional view taken along the line B—B of FIG. 16A.

Subsequently, as shown in FIGS. 16A and 16B, the surface of the upper layer 25b of the overcoat layer 25 is ground, so as to expose the respective upper faces of the bumps 61 to 66. The surface of the upper layer 25b is a pad-forming surface 25p where electrode pads will later be formed. FIG. 13 corresponds to this state.

Then, as shown in FIG. 17, reproducing electrode pads 22a, 22b are formed at upper ends of the reproducing bumps 65, 66, recording electrode pads 21a, 21b are formed at upper ends of the recording bumps 63, 64, and heater electrode pads 23a, 23b are formed at upper ends of the heater bumps 61, 62. FIGS. 4A and 4B correspond to this state.

This state is where a plurality of thin-film magnetic heads are formed on the single support 20. For yielding the head slider 13 shown in FIG. 3 from this state, the support 20 is cut into a plurality of bars each comprising thin-film magnetic heads arranged in a row, and then each bar is cut into blocks each including a thin-film magnetic head. Thereafter, the resulting block is formed with a desirable slider rail (not depicted), and then is subjected to ion milling or the like, whereby the head slider 13 is completed.

Subsequently, as shown in FIGS. 2 and 3, the head slider 13 is mounted on the leading end side of the suspension arm 12, and a printed wiring pattern 17 is laid out on the suspension arm 12. Then, respective one ends of wires 17a, 17a to 17c, 17c are bonded to terminals 15a to 15f disposed on the leading end side of the suspension arm 12, whereas their other ends are bonded to terminals 16a to 16f disposed on the base end side of the suspension arm 12, whereby a head gimbal assembly 10 is obtained. After the head gimbal assembly 10 is made, it is assembled such that the head slider 13 is movable over the hard disk 2 while being able to record and reproduce magnetic signals, whereby the hard disk drive 1 shown in FIG. 1 is completed.

In the manufacturing method of this embodiment, bump positions differ between the parts before and after forming the bypass layers 63c to 66c as mentioned above. As a consequence, positions where the electrode pads 21a, 21b, 22a, 22b to be connected to the bumps at the pad-forming surface 25p are formed can be set freely if bump positions after forming the bypass layers are adjusted, regardless of positions of their second bump portions in the track width direction. For example, even after a conventional technique providing no heater is used up to the process shown in FIG. 8, electrode pad positions can easily be fixed if only the positions of the first bump portions 63a to 66a on the bypass layers 63c to 66c are adjusted. Even when there occurs a need to change heater positions by design, no design change is required before forming the bypass layers, so that it will be sufficient if only the positions of the first bump portions are adjusted, which is advantageous.

[Second Embodiment]

A second embodiment of the present invention will now be explained. This embodiment differs from the first embodiment in that the heater and bypass layers are formed in processes different from each other.

Figure 18A:
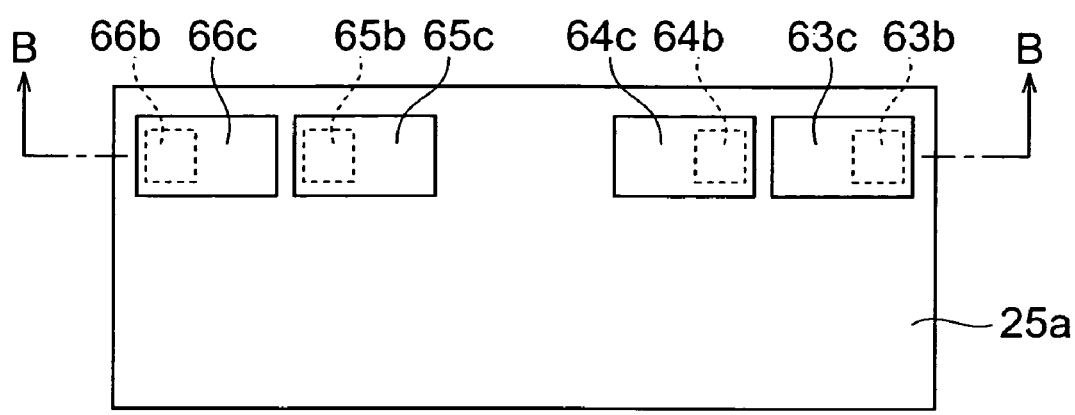
FIG. 18 is a view showing a step in the method of manufacturing a head slider in accordance with a second embodiment.
Figure 18B:
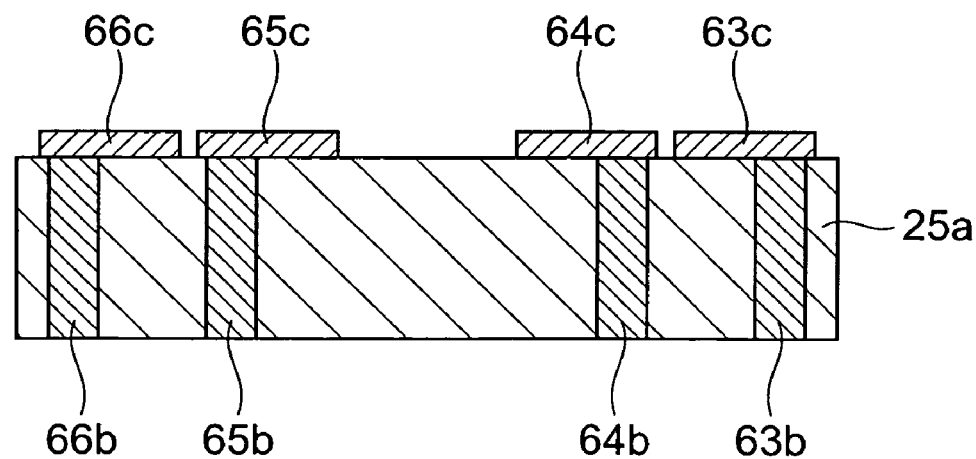

First, the processes up to the state of FIGS. 9A and 9B are carried out as in the first embodiment. Subsequently, as shown in FIGS. 18A and 18B, bypass layers 63c to 66c are formed by plating, sputtering, etc. Though the bypass layers can be formed from the same material as that used in the first embodiment, they are preferably formed from a material having a low resistivity (e.g. Cu) in order to reduce the resistance to recording currents and reproducing sense currents.

Figure 19A:
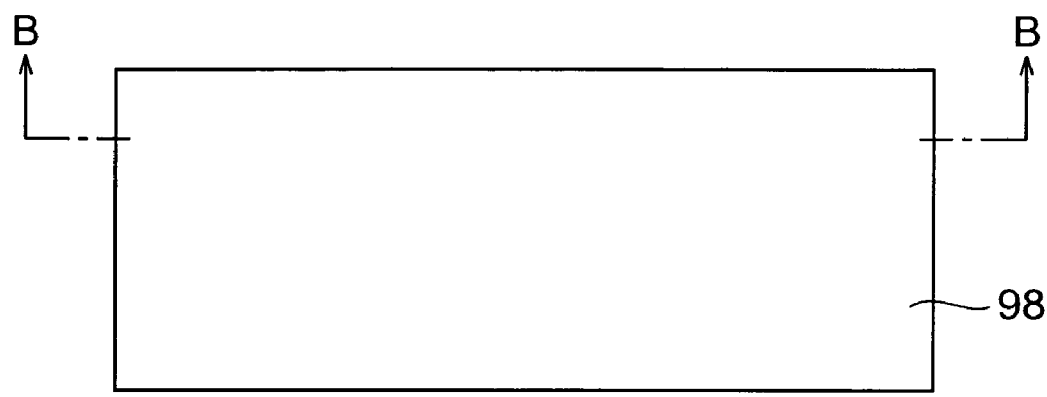
Figure 19B:
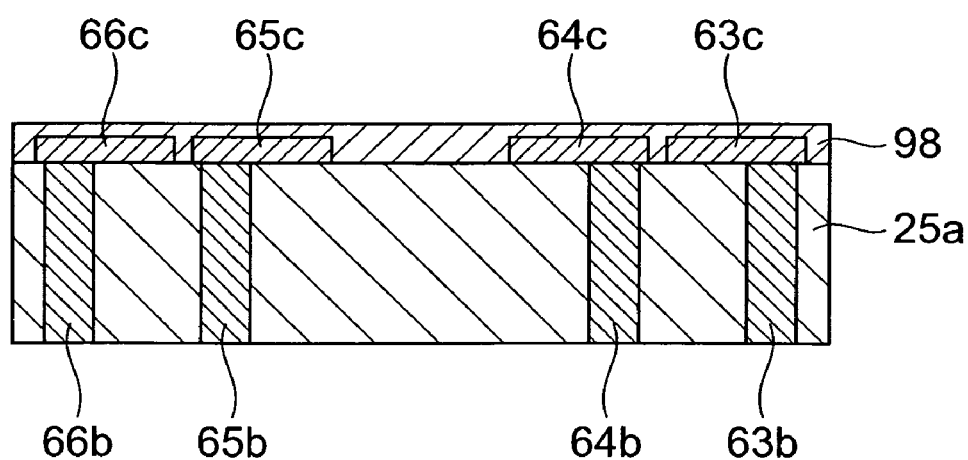
FIG. 19B is a sectional view taken along the line B—B of FIG. 19A.

Then, as shown in FIGS. 19A and 19B, a conductive layer 98 is formed on the whole surface of the wafer. The conductive layer 98 can be formed from the same material as that used in the first embodiment.

Figure 20A:
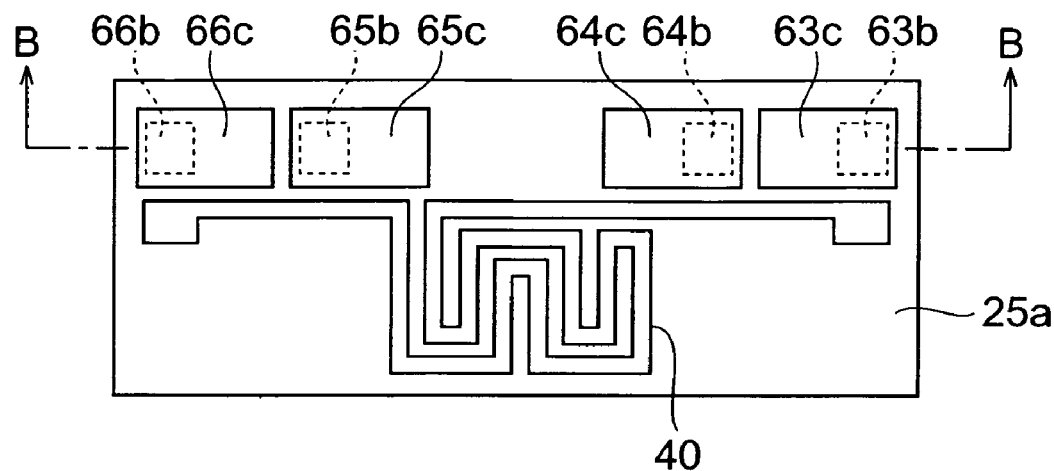
Figure 20B:
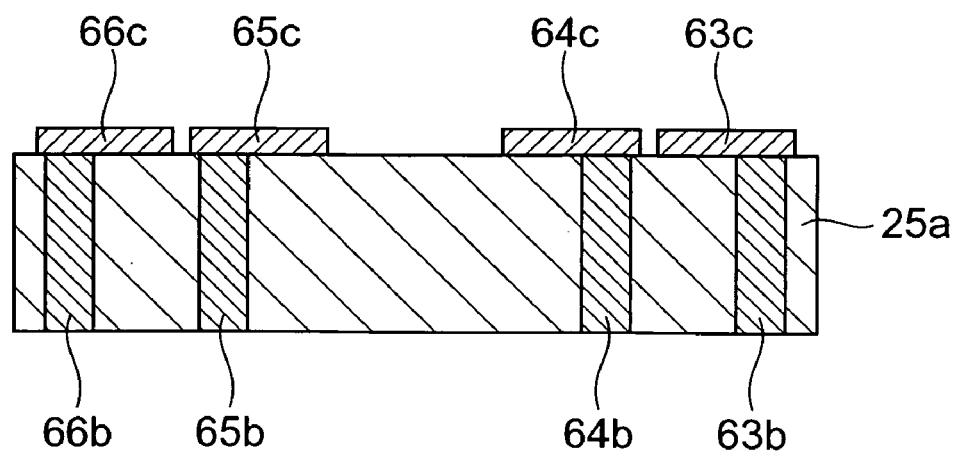
FIG. 20B is a sectional view taken along the line B—B of FIG. 20A.

Subsequently, as shown in FIGS. 20A and 20B, the conductive layer 98 is patterned by ion milling or the like, so as to form a heater 40.

Figure 21A:
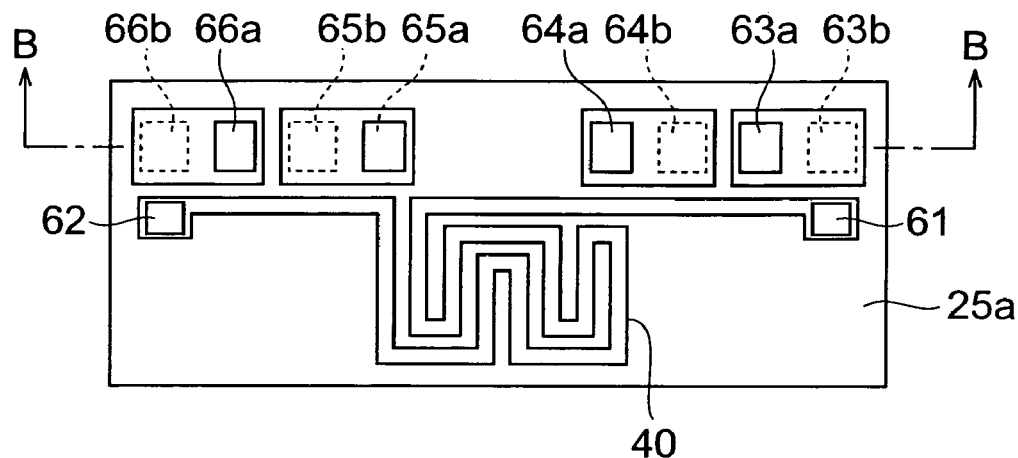
Figure 21B:
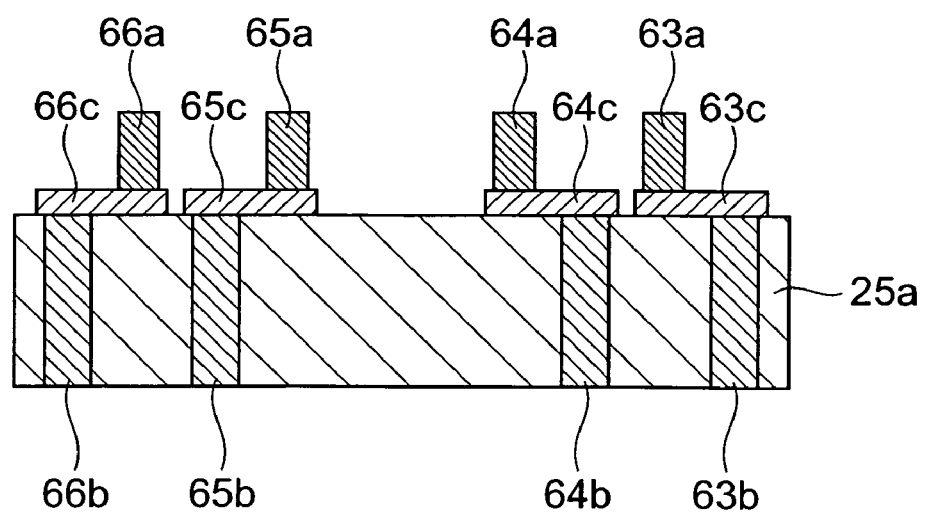
FIG. 21B is a sectional view taken along the line B—B of FIG. 21A.

After a heater coil cap layer (not depicted) made of an insulating material is formed on the heater 40, first bump portions 63a to 66a are formed as shown in FIGS. 21A and 21B, so as to yield recording bumps 63, 64 and reproducing bumps 65, 66. At the same time, heater bumps 61, 62 are formed. These bumps are formed from a material such as Cu, NiFe, NiCu, Ta, Ti, CoNiFe alloys, and FeAlSi alloys by plating, for example. As in the first embodiment, the first bump portions are positioned closer to the device center than are the second bump portions.

Figure 22A:
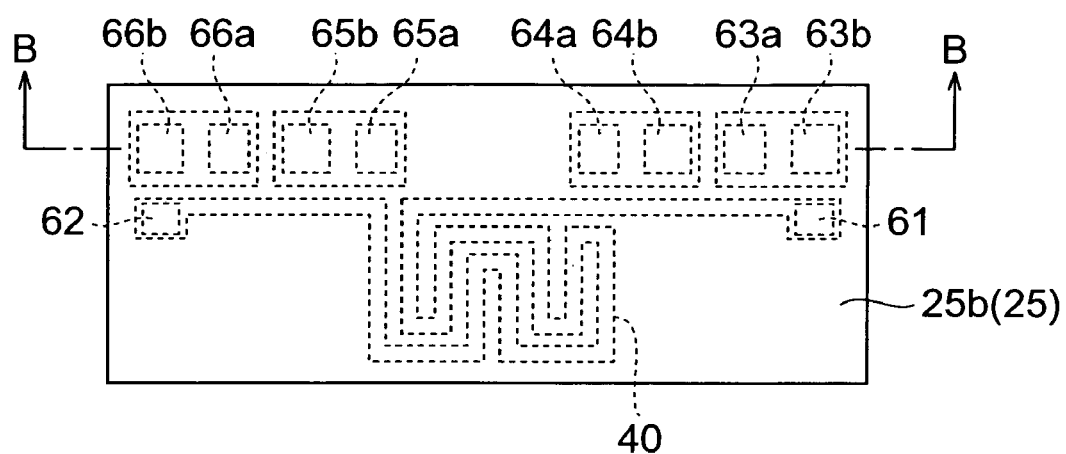
Figure 22B:
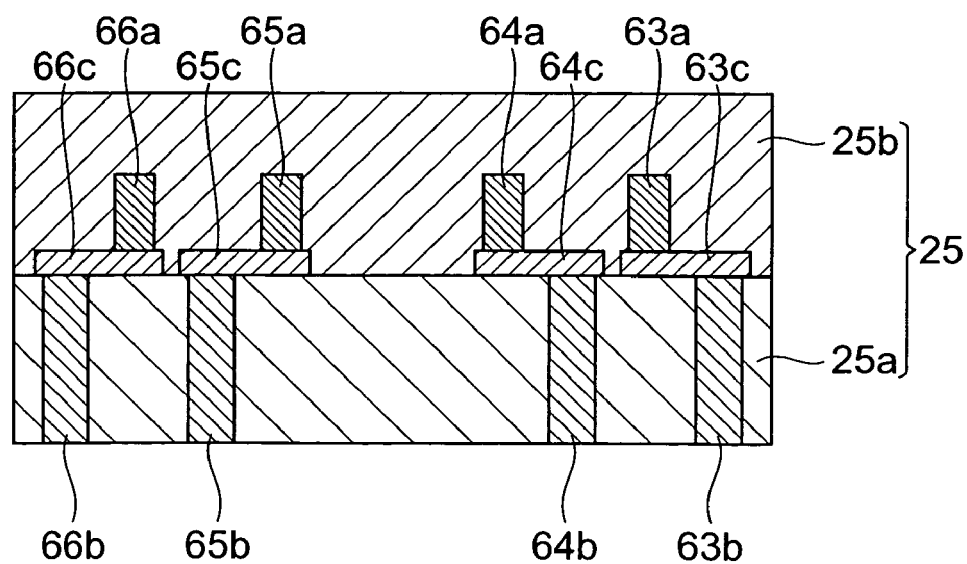
FIG. 22B is a sectional view taken along the line B—B of FIG. 22A.

Subsequently, as shown in FIGS. 22A and 22B, an upper layer 25b of an overcoat layer 25 is laminated. Here, the upper layer 25b is formed by such a height that the bumps 61 to 66 are covered therewith.

Figure 23A:
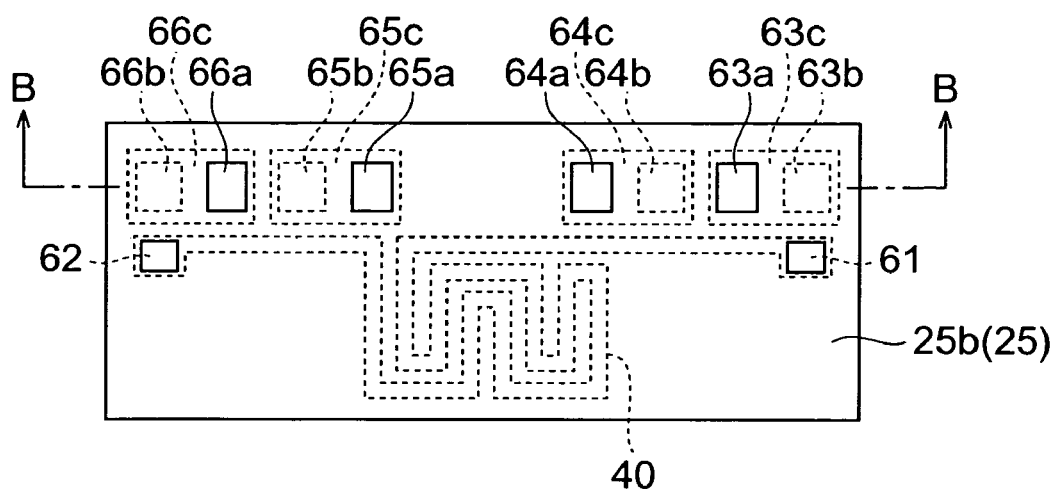
Figure 23B:
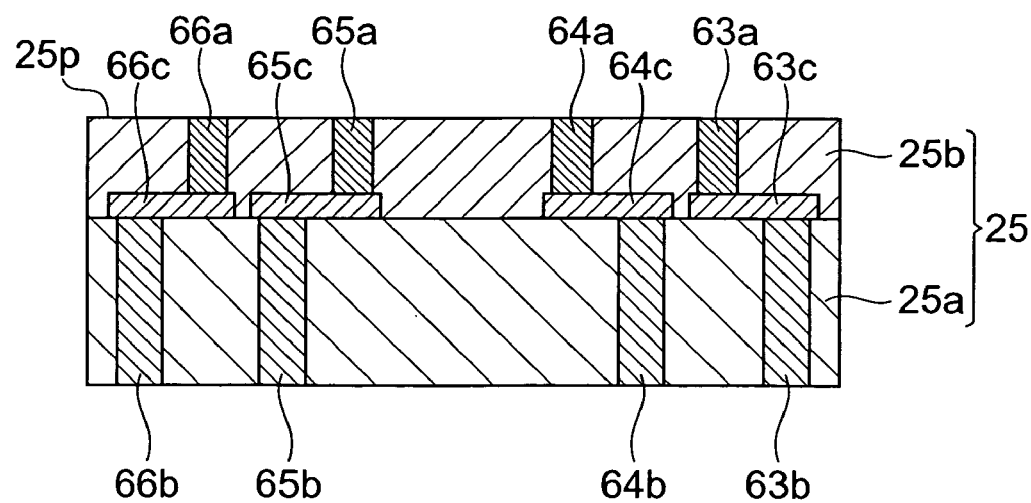
FIG. 23B is a sectional view taken along the line B—B of FIG. 23A.

Next, as shown in FIGS. 23A and 23B, the surface of the upper layer 25b of the overcoat layer 25 is ground, so as to expose the respective upper faces of the bumps 61 to 66. The surface of the upper layer 25b becomes a pad-forming surface 25p.

Subsequently, recording electrode pads 21a, 21b, reproducing electrode pads 22a, 22b, and heater electrode pads 23a, 23b are formed (see FIG. 4), and postprocessing such as dicing is carried out, whereby the head slider of this embodiment is obtained.

In this embodiment, as in the first embodiment, positions where the electrode pads 21a, 21b, 22a, 22b to be connected to the bumps at the pad-forming surface 25p are formed can be set freely if bump positions after forming the bypass layers 63c to 66c are adjusted, regardless of the bump positions before forming the bypass layers 63c to 66c.

Since the heater 40 and bypass layers 63c to 66c are formed in different processes, the bypass layers can be formed from a material having a resistivity lower than that of the heater. As a consequence, a sense current can efficiently be supplied by way of the reproducing bumps 65, 66, whereby reproducing sensitivity can be improved.

Though the invention achieved by the inventors is specifically explained with reference to the embodiments in the foregoing, the present invention is not restricted to the above-mentioned embodiments. For example, though groups of reproducing and recording bumps are provided with bypass layers, it will be sufficient if at least one of reproducing bumps, recording bumps, and heater bumps is provided with a bypass layer.

The heater 40 may be disposed between the support 20 and GMR device 30, or on the side of the electromagnetic transducer 60 opposite from the air bearing surface S, i.e., on the backside of the electromagnetic transducer 60 as seen from the air bearing surface S, for example. The heater 40 may be disposed as a single piece or a plurality of divided pieces at any of the above-mentioned positions.

What is claimed is:

1. A head slider, comprising:
   a thin-film magnetic head including a magnetoresistive device for reproducing information and an electromagnetic transducer for recording information;
   a heater that generates heat when the heater is energized;
   a reproducing-bump, which connects the magnetoresistive device and a pad-forming surface;
   a recording-bump, which connects the electromagnetic transducer with the pad-forming surface; and a heater bump, which connects the heater with the pad forming surface, wherein at least one of the reproducing-bump, the recording-bump, and the heater bump comprises a bypass layer extending in a direction that crosses a direction in which the bump extends, a first bump portion positioned closer to the pad-forming surface than is the bypass layer, and a second bump portion positioned on an opposite side of the bypass layer relative to the first bump portion, the first bump portion and the second bump portion are displaced from each other in the direction in which the bypass layer extends.

2. The head slider according to claim 1, wherein the reproducing-bump and the recording-bump each include a corresponding bypass layer, first bump portion, and second bump portion, the first bump portions are positioned closer to each other than are the second bump portions.

3. The head slider according to claim 1, wherein the reproducing-bump and the recording-bump each include a corresponding bypass layer, first bump portion, and second bump portion, a distance between each of the first bump portions is less than a distance between each of the second bump portions.

4. The head slider according to claim 1, wherein the heater and the bypass layer are formed by the same material.

5. The head slider according to claim 1, further comprising: an electrode pad for energizing the magnetoresistive device, an electrode pad for energizing the electromagnetic transducer, and an electrode pad for energizing the heater, disposed on the pad-forming surface.

6. The head slider according to claim 5, wherein two of the electrode pads for the heater are provided and are positioned on the pad-forming surface so that the electrode pad for reproducing and the electrode pad for recording are located between the two electrode pads for the heater.

7. The head slider according to claim 1, wherein the bypass layer extends in a direction perpendicular to at least one of the first bump portion and the second bump portion.

8. The head slider according to claim 1, wherein the first bump portion and the second bump portion extend parallel to each other, and the bypass layer extends in a direction perpendicular to both the first bump portion and the second bump portion.

9. A head gimbal assembly, comprising:

a head slider including a thin-film magnetic head having a magnetoresistive device for reproducing information and an electromagnetic transducer for recording information, and a heater that generates heat when the heater is energized; and an arm member on which the head slider is mounted, wherein the head slider comprises:

a reproducing-bump, which connects the magnetoresistive device and a pad-forming surface;

a recording-bump, which connects the electromagnetic transducer with the pad-forming surface; and a heater bump, which connects the heater with the pad forming surface, wherein at least one of the reproducing-bump, the recording-bump, and the heater bump comprises a bypass layer extending in a direction that crosses a direction in which the bump extends, a first bump portion positioned closer to the pad-forming surface than is the bypass layer, and a second bump portion positioned on an opposite side of the bypass layer relative to the first bump portion, the first bump portion and the second bump portion are displaced from each other in the direction in which the bypass layer extends.

10. A hard disk drive, comprising:

a head slider including a thin-film magnetic head having a magnetoresistive device for reproducing information and an electromagnetic transducer for recording information, and a heater that generates heat when the heater is energized; and a recording medium onto which information is recorded by the electromagnetic transducer, and from which recorded information is reproduced by the magnetoresistive device, wherein the head slider comprises:

a reproducing-bump, which connects the magnetoresistive device and a pad-forming surface;

a recording-bump, which connects the electromagnetic transducer with the pad-forming surface; and a heater bump, which connects the heater with the pad forming surface, wherein at least one of the reproducing-bump, the recording-bump, and the heater bump comprises a bypass layer extending in a direction that crosses a direction in which the bump extends, a first bump portion positioned closer to the pad-forming surface than is the bypass layer, and a second bump portion positioned on an opposite side of the bypass layer relative to the first bump portion, the first bump portion and the second bump portion are displaced from each other in the direction in which the bypass layer extends.

11. A method of manufacturing a head slider having a thin-film magnetic head that includes a magnetoresistive device for reproducing information and an electromagnetic transducer for recording information, and a heater that generates heat when the heater is energized, the method comprising:

a step of forming bumps that extend from the magnetoresistive device, the electromagnetic transducer, and the heater, wherein the step of forming at least one bump corresponding to at least one of the magnetoresistive device, the electromagnetic transducer, and the heater, includes forming a bypass layer that extends in a direction that crosses the direction in which the at least one bump extends, and after forming the bypass layer, the at least one bump is formed at a position that is different from a position of the at least one bump before forming the bypass layer relative to the direction in which the bypass layer extends.

12. The method of manufacturing a head slider according to claim 11, wherein the bypass layer is formed for the bumps corresponding to the magnetoresistive device and to the electromagnetic transducer, and after forming the bypass layer, the bump corresponding to the magnetoresistive device is formed at an area that is closer to the bump corresponding to the electromagnetic transducer than before the forming of the bypass layer, while the bump corresponding to the electromagnetic transducer is formed at an area closer to the magnetoresistive device than before the forming of the bypass layer.

13. The method of manufacturing a head slider according to claim 12, further comprising a step of forming, on a pad-forming surface, an electrode pad for reproducing that is connected to the bump corresponding to the magnetoresistive device, an electrode pad for recording that is connected to the bump corresponding to the electromagnetic transducer, and a pair of electrode pads for the heater that are connected to bumps corresponding to the heater, wherein
the pair of electrode pads for the heater are positioned on the pad-forming surface so that the electrode pad for reproducing and the electrode pad for recording are located between the pair of electrode pads for the heater.

14. The method of manufacturing a head slider according to claim 11, wherein the heater and the bypass layer are formed by patterning the same material.

15. The method of manufacturing a head slider according to claim 11, wherein the heater and the bypass layer are formed in a different process from each other.

16. The method of manufacturing a head slider according to claim 15, wherein the bypass layer is formed by a material with a lower specific resistance than that of the heater.

* * * * *